United States Patent
Onoshita et al.

(10) Patent No.: US 7,610,171 B2
(45) Date of Patent: Oct. 27, 2009

(54) COMPONENT EXCHANGE PROCEDURE IDENTIFYING METHOD AND PROGRAM

(75) Inventors: Sachio Onoshita, Kawasaki (JP); Hiroyuki Saito, Kawasaki (JP); Kenzo Hiraiwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 71 days.

(21) Appl. No.: 11/780,665

(22) Filed: Jul. 20, 2007

(65) Prior Publication Data
US 2007/0270993 A1 Nov. 22, 2007

Related U.S. Application Data

(63) Continuation of application No. PCT/JP2005/000835, filed on Jan. 24, 2005.

(51) Int. Cl.
*G06F 11/30* (2006.01)
(52) U.S. Cl. .......................... 702/182; 705/9
(58) Field of Classification Search ........................ None
See application file for complete search history.

(56) References Cited

U.S. PATENT DOCUMENTS

| 2002/0161617 A1* | 10/2002 | Washburn et al. | 705/8 |
| 2004/0117229 A1* | 6/2004 | Chung et al. | 705/7 |

FOREIGN PATENT DOCUMENTS

| JP | 9-300145 | 11/1997 |
| JP | 10-302001 | 11/1998 |
| JP | 2002-40884 | 2/2002 |
| JP | 2004-86719 | 3/2004 |
| JP | 2004-145715 | 5/2004 |

OTHER PUBLICATIONS

International Search Report of the International Application No. PCT/JP2005/000835 (mailed Mar. 22, 2005).

* cited by examiner

*Primary Examiner*—Bryan Bui
*Assistant Examiner*—Jonathan Teixeira Moffat
(74) *Attorney, Agent, or Firm*—Staas & Halsey LLP

(57) ABSTRACT

The method includes receiving a failure of a first operation verification carried out after exchange of a first component and an assembling work of disassembled components and storing data concerning a second component corresponding to an error code. The method includes identifying a first disassembling procedure from a disassembling step that is a reverse step of an assembling step to be carried out immediately before the first operation verification to a disassembling step of the first component, and a second disassembling procedure from a primary disassembling step to be carried out when any component of an apparatus is exchanged to a disassembling step of the second component, and when the first disassembling procedure is included in the second disassembling procedure, extracting the disassembling step that is a reverse step of the assembling step to be carried out immediately before the first operation verification and subsequent disassembling steps among the second disassembling procedure.

14 Claims, 24 Drawing Sheets

PE : PROCEDURE EXPLANATION

| ITEM NO. (3001) | COMPONENT NO. (3003) | COMPONENT NAME (3005) | PARENT ITEM NO. (3007) |
|---|---|---|---|
| 1 | CA01234-B001 | DEVICE | * |
| 2 | CA01234-X001 | DOOR | 1 |
| 3 | F6-SW2N3-06111 | SCREW (TO FIX CONTROLLER) | 1 |
| 4 | F6-SW2N3-06111 | SCREW (TO FIX CONTROLLER) | 1 |
| 5 | CA01234-C101 | CONTROLLER | 1 |
| 6 | F6-SW2N3-06111 | SCREW (CONTROLLER HINGE) | 1 |
| 7 | F6-SW2N3-06111 | SCREW (CONTROLLER HINGE) | 1 |
| 8 | CA01234-B011 | MEMORY MODULE | 5 |
| 9 | F6-SW2N3-06111 | SCREW (PANEL A) | 5 |
| 10 | F6-SW2N3-06111 | SCREW (PANEL A) | 5 |
| 11 | CA01234-Z101 | PANEL A | 5 |
| 12 | F6-SW2N3-06111 | SCREW (PANEL B) | 5 |
| 13 | F6-SW2N3-06111 | SCREW (PANEL B) | 5 |
| 14 | F6-SW2N3-06111 | SCREW (PANEL B) | 5 |
| 15 | CA01234-Z102 | PANEL B | 5 |
| 16 | F6-SW2N3-06111 | SCREW (PT BOARD MODULE) | 5 |
| 17 | F6-SW2N3-06111 | SCREW (PT BOARD MODULE) | 5 |
| 18 | F6-SW2N3-06111 | SCREW (PT BOARD MODULE) | 5 |
| 19 | F6-SW2N3-06111 | SCREW (PT BOARD MODULE) | 5 |
| 20 | F6-SW2N3-06111 | SCREW (PT BOARD MODULE) | 5 |
| 21 | F6-SW2N3-06111 | SCREW (PT BOARD MODULE) | 5 |
| 22 | CA01234-C201 | PT BOARD MODULE | 5 |
| 23 | F6-SW2N3-06111 | SCREW (CPU BOARD) | 22 |
| 24 | F6-SW2N3-06111 | SCREW (CPU BOARD) | 22 |
| 25 | F6-SW2N3-06111 | SCREW (CPU BOARD) | 22 |
| 26 | F6-SW2N3-06111 | SCREW (CPU BOARD) | 22 |
| 27 | CA56789-B301 | CPU BOARD | 22 |
| 28 | CA24680-D001 | DRIVE BAY | 1 |
| 29 | F6-SW2N3-06111 | SCREW (HARD DISK) | 28 |
| 30 | F6-SW2N3-06111 | SCREW (HARD DISK) | 28 |
| 31 | CA24680-D111 | HARD DISK | 28 |
| ... | | | |

| ITEM NO. 4001 | COMPONENT NO. 4003 | PARENT ITEM NO. 4011 | DISASSEMBLING NO. 4013 | ASSEMBLING NO. 4015 | DISASSEMBLING PROCEDURE CODE 4021 | ASSEMBLING PROCEDURE CODE 4023 | DIAGNOSTIC STEP 4025 |
|---|---|---|---|---|---|---|---|
| 1 | CA01234-B001 | * | * | * | * | * | * |
| 2 | CA01234-X001 | 1 | 1 | | Mov1-1D | Mov1-1A | |
| 3 | F6-SW2N3-06111 | 1 | 2 | | Mov1-2D | Mov1-2A | |
| 4 | F6-SW2N3-06111 | 1 | 2 | | Mov1-2D | Mov1-2A | |
| 5 | CA01234-C101 | 1 | 3 | | Mov1-3D | Mov1-3A | 1 |
| 6 | F6-SW2N3-06111 | 1 | 4 | | Mov1-4D | Mov1-4A | |
| 7 | F6-SW2N3-06111 | 1 | 4 | | Mov1-4D | Mov1-4A | |
| 8 | CA01234-B011 | 5 | 1 | | Mov5-1D | Mov5-1A | |
| 9 | F6-SW2N3-06111 | 5 | 2 | | Mov5-2D | Mov5-2A | |
| 10 | F6-SW2N3-06111 | 5 | 2 | | Mov5-2D | Mov5-2A | |
| 11 | CA01234-Z101 | 5 | 3 | | Mov5-3D | Mov5-3A | |
| 12 | F6-SW2N3-06111 | 5 | 4 | | Mov5-4D | Mov5-4A | |
| 13 | F6-SW2N3-06111 | 5 | 4 | | Mov5-4D | Mov5-4A | |
| 14 | F6-SW2N3-06111 | 5 | 4 | | Mov5-4D | Mov5-4A | |
| 15 | CA01234-Z102 | 5 | 5 | | Mov5-5D | Mov5-5A | |
| ... | | | | | | | |
| 21 | F6-SW2N3-06111 | 5 | 6 | | Mov5-6D | Mov5-6A | |
| 22 | CA01234-C201 | 5 | 7 | | Mov5-7D | Mov5-7A | |
| 23 | F6-SW2N3-06111 | 22 | 1 | | Mov22-1D | Mov22-1A | |
| 24 | F6-SW2N3-06111 | 22 | 1 | | Mov22-1D | Mov22-1A | |
| 25 | F6-SW2N3-06111 | 22 | 1 | | Mov22-1D | Mov22-1A | |
| 26 | F6-SW2N3-06111 | 22 | 1 | | Mov22-1D | Mov22-1A | |
| 27 | CA56789-B301 | 22 | 2 | | Mov22-2D | Mov22-2A | |
| ... | | | | | | | |

| 5001 | 5003 | 5005 | 5007 | 5009 |
|---|---|---|---|---|
| ERROR CODE | ERROR CAUSE | PRIORITY DEGREE | NAME OF COMPONENT TO BE EXCHANGED | ITEM NO. |
| 10-20-30 | MEMORY ERROR | 1 | MEMORY MODULE | 8 |
| 10-20-30 | MEMORY ERROR | 2 | CPU BOARD | 27 |
| 10-30-50 | CPU ERROR | 1 | CPU BOARD | 27 |
| ... | | | | |

FIG.5

| 7001 | 7003 | 7005 | 7007 | |
|---|---|---|---|---|
| DISASSEMBLING START COMPONENT | COMPONENT TO BE EXCHANGED | PARENT ITEM NO. | DISASSEMBLING PROCEDURE CODE | |
| 1 | — | — | — | 7011 |
| 1 | 8 | 5 | Mov5-1D | 7021 |
| 1 | 8 | 1 | Mov1-1D, Mov1-2D, ···Mov1-4D | 7031 |
| 1 | 8 | * (NO APPLICABLE DATA) | * (NO APPLICABLE DATA) | 7041 |

FIG.7

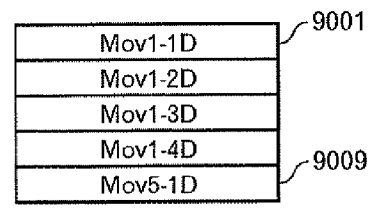
FIG.9
| COMPONENT TO BE ASSEMBLED LASTLY | COMPONENT TO BE ASSEMBLED FIRSTLY | PARENT ITEM NO. | ASSEMBLING PROCEDURE CODE |
|---|---|---|---|
| 1 | — | — | — |
| 5 | 27 | 22 | Mov22-1A, Mov22-2A |
| 5 | 27 | 5 | Mov5-1A, Mov5-2A, ···Mov5-7A |
| 5 | 27 | 1 | Mov1-1A, Mov1-2A, ···Mov1-4A |
FIG.10
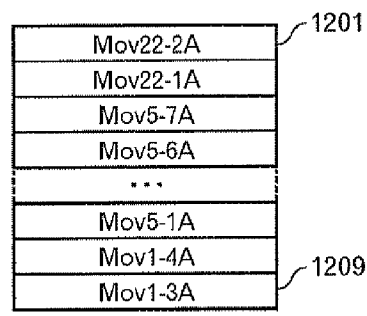
FIG.12

DP: DISASSEMBLING CODE
AP: ASSEMBLING CODE

| ITEM NO. | COMPONENT NO. | PARENT ITEM NO. | DISASSEMBLING NO. | ASSEMBLING NO. | DISASSEMBLING PROCEDURE CODE | ASSEMBLING PROCEDURE CODE | DIAGNOSTIC STEP |
|---|---|---|---|---|---|---|---|
| 1 | CA01234-B001 | * | * | * | * | * | * |
| 2 | CA01234-X001 | 1 | 1 | | Mov1-1D | Mov1-1A | |
| 3 | F6-SW2N3-06111 | 1 | 2 | | Mov1-2D | Mov1-2A | |
| 4 | F6-SW2N3-06111 | 1 | 2 | | Mov1-2D | Mov1-2A | |
| 5 | CA01234-C101 | 1 | 3 | | Mov1-3D | Mov1-3A | 1 |
| 6 | F6-SW2N3-06111 | 1 | 4 | | Mov1-4D | Mov1-4A | |
| 7 | F6-SW2N3-06111 | 1 | 4 | | Mov1-4D | Mov1-4A | |
| 28 | CA24680-D001 | 1 | 5 | | Mov1-5D | Mov1-5A | |
| 29 | F6-SW2N3-06111 | 28 | 1 | | Mov28-1D | Mov28-1A | |
| 30 | F6-SW2N3-06111 | 28 | 1 | | Mov28-1D | Mov28-1A | |
| 31 | CA24680-D111 | 28 | 2 | | Mov28-2D | Mov28-2A | |
| ... | | | | | | | |

FIG.21

(a) 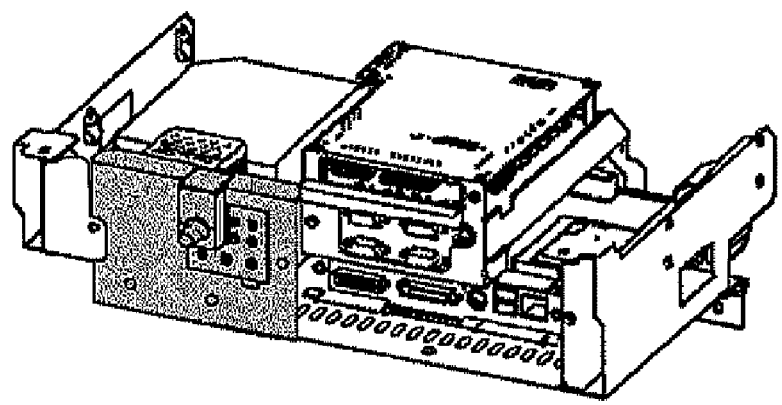
(b) 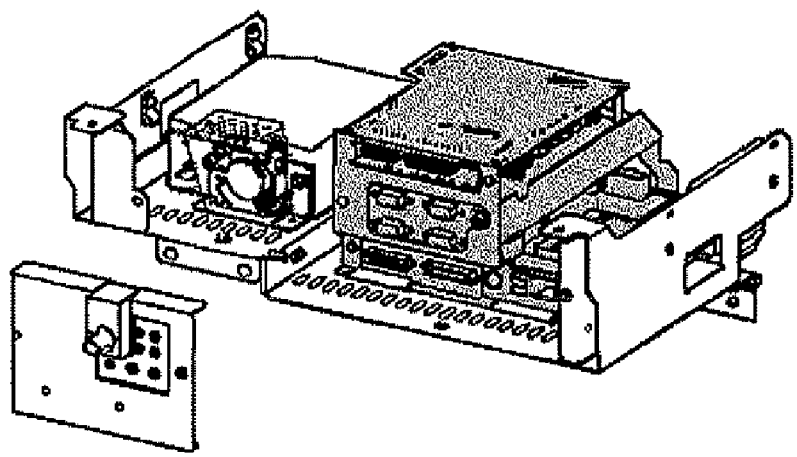
FIG.31

(a) 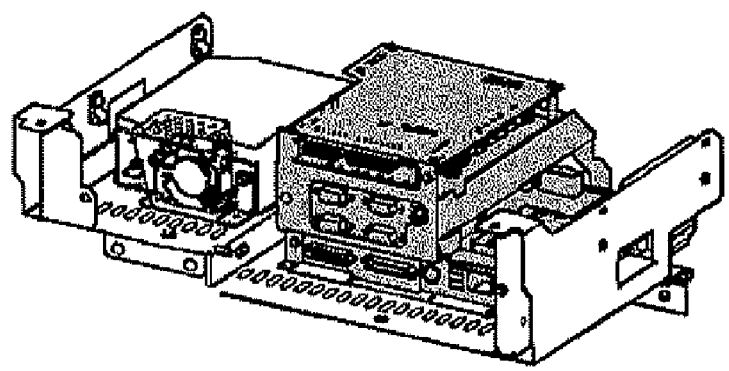
(b) 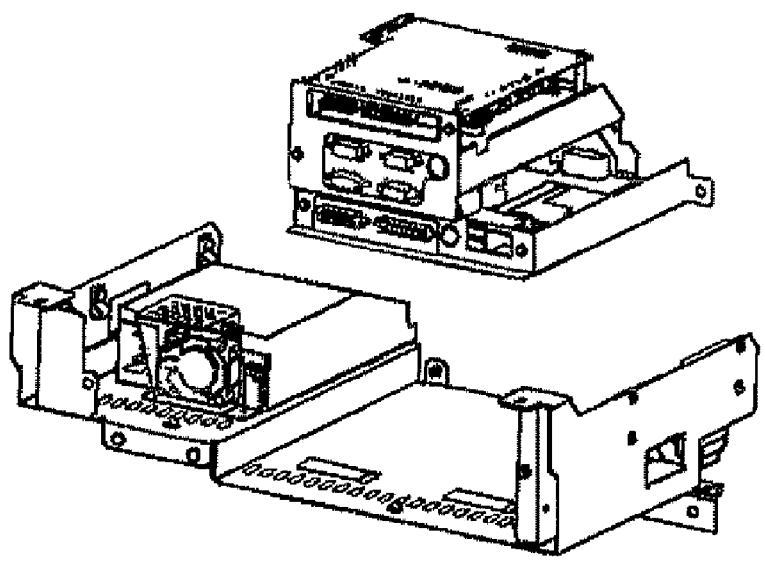
FIG.32

COMPONENT EXCHANGE PROCEDURE IDENTIFYING METHOD AND PROGRAM

CROSS-REFERENCE TO RELATED APPLICATIONS

This application is a continuing application, filed under 35 U.S.C. section 111(a), of International Application PCT/JP2005/000835, filed Jan. 24, 2005.

TECHNICAL FIELD OF THE INVENTION

This invention relates to a technique to identify a procedure for exchanging components of an apparatus.

BACKGROUND OF THE INVENTION

Currently, when a failure of a hardware system in, for example, a computer system occurs, a field engineer (FE) goes to an installation site, identifies a cause of the failure, and takes an action such as exchange of a component or the like. In such a case, the FE has to work while referring to plural manual books such as a manual book to identify the failure, a manual book to exchange a component seemed to be failed, and the like.

On the other hand, in order to enable a user to easily carry out the work such as component exchange work without referring to the manual books, a technique to explain the work procedure by images or voice exists. As such a technique, for example, a technique described in JP-A-2002-040884 exists. Specifically, in an image forming apparatus such as a facsimile having display means and voice output means, when a trouble is detected at any place, information of an operational procedure concerning the recovery of the trouble is displayed through the display means by characters or images, and a message thereof is output by the voice from the voice output means. Thus, in this publication, a method to provide the operational procedure predetermined in association with the trouble for the user is described. However, there is no description for an item for forming a work procedure in a unit of work steps, which compose the work procedure.

In a case of an apparatus, for which the work procedure for the failure recovery can easily be identified by an error code, such as the facsimile apparatus, because it is effective to display the predetermined work procedure step-by-step, the aforementioned conventional technique is also effective. On the other hand, in a case of a complicated apparatus such as a computer, there are many cases in which plural failure causes are supposed. Therefore, for example, when the failure is not recovered even by the work carried out according to the first work procedure, it is necessary to carry out the work according to another work procedure after the component, which was exchanged in the work carried out according to the first work procedure, is put back to the original place. In such a case, according to the aforementioned conventional technique, it is impossible to form the work procedure in the unit of the work steps, which compose the work procedure, and even when the duplicated steps in plural work procedures exists, it is impossible to identify and remove such unnecessary steps. Thus, because the duplication of the work procedure between the work procedure to return to a state before the first work procedure was carried out and another work procedure often occurs, there exists a problem that the work efficiency falls down.

SUMMARY OF THE INVENTION

Therefore, an object of this invention is to provide a technique to identify an efficient procedure for the component exchange.

A component exchange procedure identifying method according to this invention is a method for identifying a procedure to exchange a component of an apparatus (e.g. computer apparatus or the like), and includes: receiving data representing a failure of a first operation verification carried out after exchange of a first component and an assembling work of disassembled components, in a state that data concerning the first component corresponding to an error code output from the apparatus is stored in a storage unit; storing data concerning a second component corresponding to the error code into the storage unit; referring to a component data storage storing data of components, and disassembling steps and assembling steps, which correspond to each component, to identify, as a disassembling procedure of the first component, a disassembling procedure from a disassembling step corresponding to an assembling step to be carried out immediately before the first operation verification to a disassembling step of the first component, and identify, as a disassembling procedure of the second component, a disassembling procedure from a first disassembling step to be carried out when the component of the apparatus is exchanged to a disassembling step of the second component, and storing the identified disassembling procedures of the first and second components into a procedure storage; and when the disassembling procedure of the first component is included in the disassembling procedure of the second component, referring to the procedure storage to store a disassembling step corresponding to an assembling step to be carried out immediately before the first operation verification and subsequent disassembling steps among the disassembling procedure of the second component into an output data storage.

Thus, it becomes possible to include the disassembling procedure to put the component exchanged immediately before back to the original place into the disassembling procedure to exchange the next component. That is, it is possible to identify the efficient work procedure.

In addition, this invention may include: referring to the component data storage to identify, as an assembling procedure of the second component, an assembling procedure from an assembling step of the second component to an assembling step to be carried out immediately before a second operation verification, which is carried out after the exchange of the second component and assembling work of disassembled components, and storing the identified assembling procedure of the second component into the procedure storage; and when the disassembling procedure of the first component is included in the disassembling procedure of the second component, and an assembling step of the first component, which is identified from the component data storage, is included in the assembling procedure of the second component, referring to the procedure storage to store a disassembling step corresponding to an assembling step to be carried out immediately before the first operation verification and subsequent steps among the disassembling procedure of the second component, and the assembling procedure of the second component, into the output data storage. Thus, it becomes possible to include the disassembling procedure to put the component exchanged immediately before out into the disassembling procedure of the next component, and include the assembling step to put the original component back into the assembling procedure of the next component. That is, it is possible to identify the efficient work procedure.

Furthermore, this invention may include: when the disassembling procedure of the first component is not included in the disassembling procedure of the second component (for example, when the first component is a component to be disassembled at a disassembling step after that of the second component, or when the disassembling procedure of the second component branches from the disassembling procedure of the first component on the way and leads to the disassembling step of the second component without passing through the disassembling step of the first component), storing the disassembling procedure of the first component and the assembling step of the first component into the output data storage; referring to the component data storage to identify, as an assembling procedure of the first component, an assembling procedure from the next step of the assembling step of the first component to an assembling step corresponding to the first disassembling step, and storing the identified assembling procedure of the first component into the procedure storage; referring to the component data storage to identify disassembling steps corresponding to assembling steps included in the assembling procedure of the first component among the disassembling steps included in the disassembling procedure of the second component; identifying the last disassembling step among the identified disassembling steps, and storing the identified last disassembling step into the storage unit; and storing an assembling procedure from the next assembling step of the assembling step of the first component to an assembling step corresponding to the last disassembling step among the assembling procedure of the first component, and a disassembling procedure from the last disassembling step to the disassembling step of the second component among the disassembling procedure of the second component into the output data storage. Thus, even when the component should be put back unwillingly, it is possible to identify the work procedure suppressing the extra-work to the minimum.

Furthermore, the component data storage may further store data concerning a component to be assembled immediately before the operation verification. Thus, by referring to the component data storage, it is possible to identify when the operation verification should be carried out. Incidentally, the data concerning the component to be assembled immediately before the operation verification may be prepared for each component to be exchanged or may be prepared for plural components to be exchanged.

Incidentally, it is possible to create a program for causing a computer to execute the component exchange procedure identifying method according to the present invention. The program is stored into a storage medium or a storage device such as, for example, a flexible disk, a CD-ROM, a magneto-optical disk, a semiconductor memory, or a hard disk. In addition, the program may be distributed as digital signals over a network in some cases. Data under processing is temporarily stored in the storage device such as a computer memory.

BRIEF DESCRIPTION OF THE DRAWINGS

FIGS. 14 to 23 is carried out;

FIG. 3 is a diagram showing an example of data of a component configuration table;

FIG. 4 a diagram showing an example of data of a procedure table;

FIG. 5 is a diagram showing an example of data of a maintenance table;

FIG. 7 is a diagram showing an example of data stored in a first work state storage;

FIG. 9 is a diagram showing an example of data stored in a disassembling procedure storage;

FIG. 10 is a diagram showing an example of data stored in a second work state storage;

FIG. 12 is a diagram showing an example of data store in an assembling procedure storage;

FIG. 14 is a diagram showing a processing flow of an other error handling processing;

FIG. 15 is a diagram showing the processing flow of the other error handling processing;

FIG. 16 is a diagram showing an example of data used in the other error cause handling processing;

FIG. 17 is a diagram showing an example of data used in the other error cause handling processing;

FIG. 18 is a diagram showing an example of data used in the other error cause handling processing;

FIG. 19 is a diagram showing an example of data used in the other error cause handling processing;

FIG. 20 is a diagram showing the processing flow of the other error cause handling processing;

FIG. 21 is a diagram showing an example of data of another procedure table;

FIG. 22 is a diagram showing a processing of a re-assembling procedure extraction processing;

FIG. 23 is a diagram showing an example of data used in the re-assembling procedure extraction processing;

FIG. 31 is a diagram showing an example of the procedure explanation image corresponding to the disassembling procedure code;

FIG. 32 is a diagram showing an example of the procedure explanation image corresponding to the disassembling procedure code;

DETAILED DESCRIPTION OF THE PREFERRED EMBODIMENTS

Figure 1:
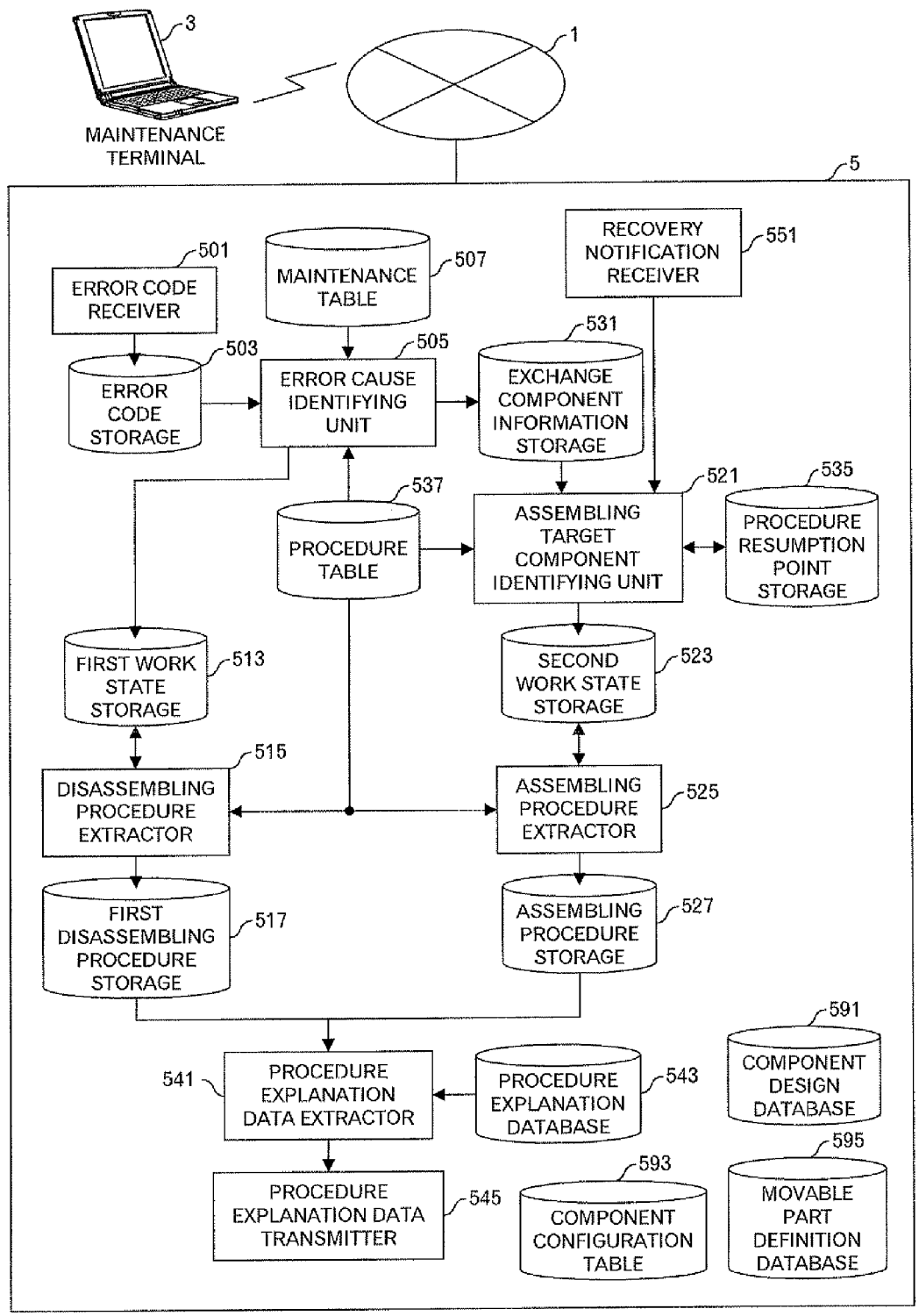
FIG. 1 is a system outline diagram according to an embodiment of this invention.

FIG. 1 shows a system outline according to one embodiment of this invention, and a portion of server's functional blocks. A maintenance terminal 3 and a maintenance server 5 are connected to a network 1 such as the Internet. The maintenance terminal 3 has, for example, a Web browser function, and can access the maintenance server 5 through the network 1. Incidentally, this embodiment is directed to a client-server configuration, which is composed of the maintenance terminal 3 that is a client and the maintenance server 5 that is a server, but may be directed to a stand-alone configuration in which all functions of the maintenance server 5 are implemented in, for example, the maintenance terminal 3.

As shown in FIG. 1, the maintenance server 5 includes: an error code receiver 501; an error code storage 503; an error cause identifying unit 505; a maintenance table 507; a first work state storage 513; a disassembling procedure extractor 515; a first disassembling procedure storage 517; an assembling target component identifying unit 521; a second work state storage 523; an assembling procedure extractor 525; an assembling procedure storage 527; an exchange component information storage 531; a procedure resumption point storage 535; a procedure table 537; a procedure table 537; a procedure explanation data extractor 541; a procedure explanation database 543; a procedure explanation data transmitter 545; a recovery notification receiver 551; a component design database 591; a component configuration table 593; and a movable part definition database 595. The error code receiver 501 receives an error code from the maintenance terminal 3, and stores the error code into the error code storage 503. The error cause identifying unit 505 refers to the error code storage 503, the maintenance table 507, and the procedure table 537 to carry out a processing, and stores the processing result into the first work state storage 513 and the exchange component information storage 531. The disassembling procedure extractor 515 refers to the first work state storage 513 and the procedure table 537 to carry out a processing, and stores the processing result into the first disassembling procedure storage 517. The assembling target component identifying unit 521 refers to at least one of the exchange component information storage 531, the procedure resumption point storage 535 and the procedure table 537 to carry out a processing, and store the processing result into the second work state storage 523 and the procedure resumption point storage 535. The assembling procedure extractor 525 refers to the second work state storage 523 and the procedure table 537 to carry out a processing, and stores the processing result into the assembling procedure storage 527. The procedure explanation data extractor 541 refers to the first disassembling procedure storage 517 and the assembling procedure storage 527, and reads out data from the procedure explanation database 543, and outputs the data to the procedure explanation data transmitter 545. The procedure explanation data transmitter 545 transmits the data read out by the procedure explanation data extractor 541 to the maintenance terminal 3. When receiving a recovery notification from the maintenance terminal 3, the recovery notification receiver 551 outputs an instruction of a processing to the assembling target component identifying unit 521. A design plan and a component number for each component are registered in the component design database 591. Parent-child relation of the components, that is, dependence relation of the components defined on the apparatus structure, is registered into the component configuration table 593. The movable range of the component is registered in the movable part definition table 595. For example, image data and the like to explain the work procedure, which are created based on the data stored in the component design database 591, the component configuration table 593, and the movable part definition database 595, are registered in the procedure explanation database 543. The maintenance terminal 3 refers to the component design database 591, the component configuration table 593 and the movable part definition database 595, if necessary.

Figure 2:
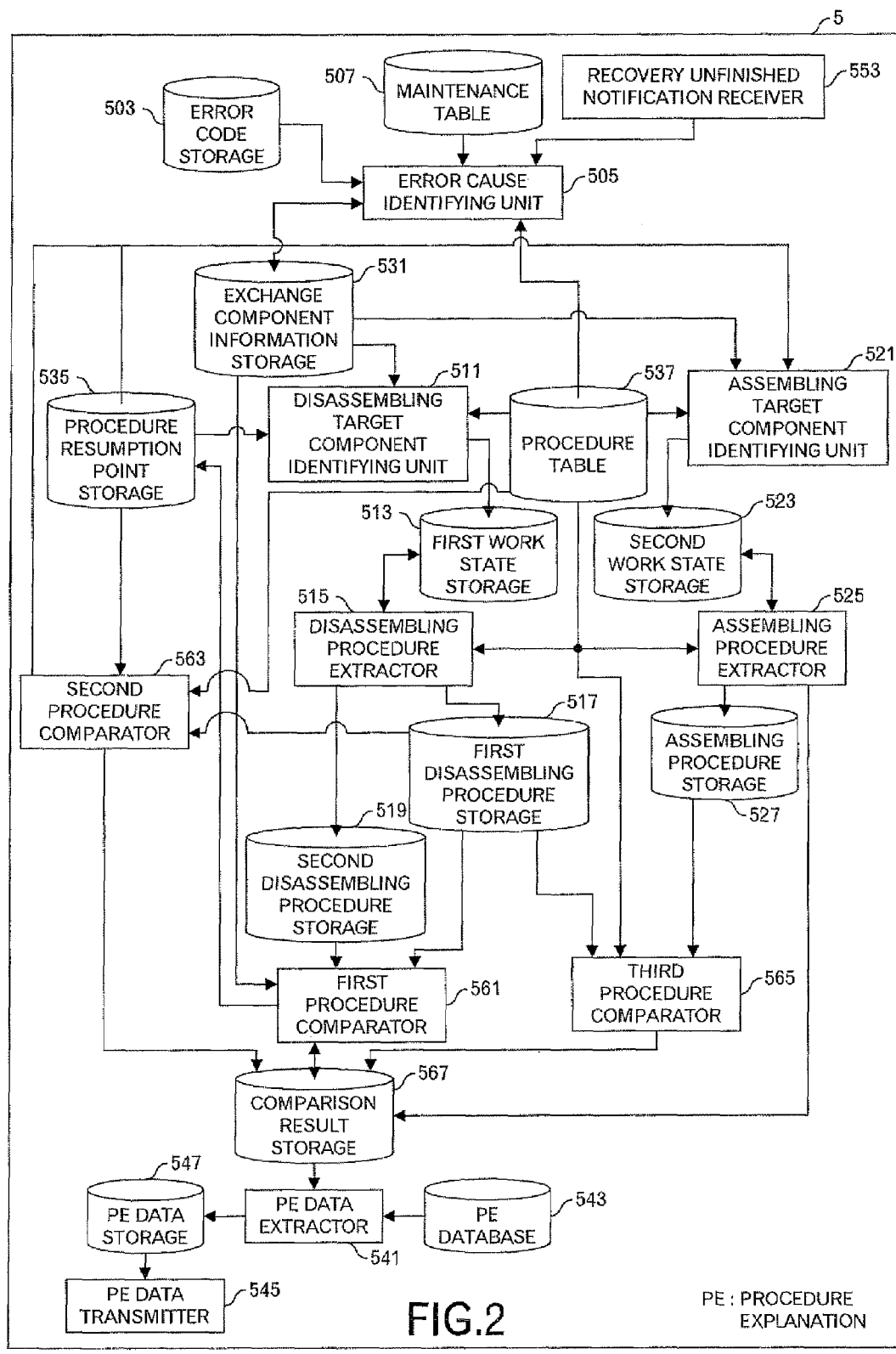
FIG. 2 is a functional block diagram of a server when a processing to be explained by using

FIG. 2 shows a functional block configuration of the server 5 when carrying out a processing, which will be explained by using FIGS. 14 to 23. As shown in FIG. 2, the maintenance server 5 further includes: a recovery unfinished notification receiver 553; a disassembling target component identifying unit 511; a second disassembling procedure storage 519; a procedure explanation data storage 547; a first procedure comparator; a second procedure comparator 563; a third procedure comparator 565 and a comparison result storage 567 when receiving a recovery unfinished notification from the maintenance terminal 3, the recovery unfinished notification receiver 553 outputs an instruction of a processing to the error cause identifying unit 505. The error cause identifying unit 505 refers to the error code storage 503, the maintenance table 507 and the exchange component information storage 531 to carry out a processing, and stores the processing result into the exchange component information storage 531. The disassembling target component identifying unit 511 refers to at least one of the exchange component information storage 531, the procedure resumption point storage 535, the procedure table 537 to carry out a processing, and stores the processing result into the first work state storage 513. The disassembling procedure extractor 515 refers to the first work state storage 513 to carry out a processing, and stores the processing result into the first disassembling procedure storage 517 and the second disassembling procedure storage 519. The assembling target component identifying unit 521 refers to at least one of the exchange component information storage 531, the procedure resumption point storage 535 and the procedure table 537 to carry out a processing, and stores the processing result into the second work state storage 523. The assembling procedure extractor 525 refers to the second work state storage 523 to carry out a processing, and stores the processing result into the assembling procedure storage 527 or the comparison result storage 567. The first procedure comparator 561 refers to the first disassembling procedure storage 517, the second disassembling procedure storage 519, the exchange component information storage 531, and the comparison result storage 567 to carry out a processing, and stores the processing result into the processing result into the comparison result storage 567 and the procedure resumption point storage 535. The second procedure comparator 563 refers to the procedure resumption point storage 535, the procedure table 537 and the first disassembling procedure storage 517 to carry out a processing, and stores the processing result into the comparison result storage 567 or outputs an instruction of a processing to the assembling target component identifying unit 521. The third procedure comparator 565 refers to the first disassembling procedure storage 517, the disassembling procedure storage 527 and the procedure table 537 to carry out a processing, and stores the processing result into the comparison result storage 567. The procedure explanation data extractor 541 refers to the comparison result storage 567, reads out data from the procedure explanation database 543, and stores the data into the procedure explanation data storage 547. The procedure explanation data transmitter 545 transmits the data stored in the procedure explanation data storage 547 to the maintenance terminal 3. Incidentally, the same names and symbols as those of the functional blocks shown in FIG. 1 among the functional blocks shown in FIG. 2 indicate the same functional blocks in FIG. 1. In addition, functional blocks, which are not used in the processing to be explained by using FIGS. 14 to 23, among the functional blocks shown in FIG. 1 are not shown in FIG. 2.

FIG. 3 shows an example of the component configuration table 593. In the example of FIG. 3, the component configuration table 593 is a table defining component configuration of an apparatus to be maintained, and includes a column 3001 of an item number, a column 3003 of a component number, a column 3005 of a component name, and a column 3007 of a parent item number. The item number is uniquely set for each component. The parent item number represents an item number of a component on which that component on the apparatus structure depends, that is, a parent component. The components, which depend on the same component, are brothers, mutually. For example, because the parent item number of the component of the item number "8" is "5", the component of the item number "8" and the component of the item number "5" are in parent-child relation, and the component of the item number "8" and the components of the item numbers "9" to "22", which have the same parent number, are in brother relation. As for the components in the parent-child relation, it is necessary to firstly disassemble the parent component in order to disassemble the child components, and it is necessary to firstly assemble the child components in order to the parent components, reversely.

FIG. 4 shows an example of the procedure table 537 for the apparatus to be maintained, which has the component configuration shown in FIG. 3. In the example of FIG. 4, the procedure table 537 includes a column 4001 of an item number, a column 4003 of a component number, a column 4011 of a parent item number, a column 4013 of a disassembling number, a column 4015 of an assembling number, a column 4021 of a disassembling procedure code, a column 4023 of an assembling procedure code, and a column 4025 of a diagnostic step. The same data as the data registered in the component configuration table 593 is registered in the column 4001 of the item number, the column 4003 of the component number, and the column 4011 of the parent item number. The disassembling number defines an order of the disassembling steps among the components, which are brothers. For example, in order to disassemble the component of the item number "11", it is necessary to disassemble the components of the item numbers "8" to "10", which are brothers of the component of the item number "11", and have the disassembling number less than the disassembling number of the component of the item number "11". Similarly, the assembling number defines an order of the assembling steps among the components, which are brothers. For example, in order to assemble the component of the item number "8", it is necessary to assemble the components of the item numbers "9" to "22", which are brothers of the component of the item number "8", and have the assembling number greater than the assembling number of the component of the item number "8". In the column 4015 of the assembling number, data is omitted in principles because the assembling number is the same number as that in the column 4013 of the disassembling number, and only when the assembling number is different from the disassembling number, the order is registered in the column 4015 of the assembling number. The disassembling procedure code corresponds to the parent item number and the disassembling number. The assembling procedure code corresponds to the parent item number and the assembling number. The column 4025 of the diagnostic step indicates a component, which is assembled immediately before the diagnostic for the component to be exchanged. In this embodiment, it is represented that the component of the item number "5", which is a component for which "1", is input into the column 4025 of the diagnostic step, is a component to be assembled immediately before the diagnostic step. However, the item number of the component to be exchanged may be input into the column 4025 of the diagnosis step. Thus, it is possible to set the different diagnostic step for each component to be exchanged.

FIG. 5 shows an example of the maintenance table 507. In the example of FIG. 5, the maintenance table 507 includes a column 5001 of an error code, a column 5003 of an error cause, a column 5005 of a priority degree, a column 5007 of a name of a component to be exchanged, and a column 5009 of an item number. The error cause is registered in association with the error code. Generally, plural components to be exchanged correspond to the error cause, and each of the components to be exchanged is registered with the priority degree. The priority is set to the component in a descending order of the possibility of the error cause, for example.

Next, a processing in this embodiment will be explained by using FIG. 6. First, the maintenance terminal 3 transmits an error code to the maintenance server 5 in response to an instruction (step S1). The error code receiver 501 of the maintenance server 5 receives the error code, and stores the error code into the error code storage 503 (step S3). The error cause identifying unit 505 reads out the stored error code, and refers to the maintenance table 507 to identify an error cause corresponding to the error code (step S5). Next, the error cause identifying unit 505 reads out the item number of the component whose priority degree is the highest among the components to be exchanged, which correspond to the error cause, refers to the procedure table 537 to read out the disassembling procedure codes and the assembling procedure codes, which correspond to the read item number, and stores the read codes as information to identify the component to be exchanged into the exchange component information storage 531 (step S7). Furthermore, the error cause identifying unit 505 stores the read item number as information of the component to be exchanged into the first work state storage 513 (step S9). In this embodiment, when, for example, the error code "10-2-30" is received from the maintenance terminal 3, the error cause identifying unit 505 refers to the maintenance table 507 shown in FIG. 5. Then, it is identified that the corresponding error cause is "memory error", and the component whose priority degree is the highest is a "memory module".

FIG. 7 shows an example of data stored in the first work state storage 513. In the example of FIG. 7, the first work state storage 513 stores a table to temporarily store data used in the disassembling procedure extraction processing, and the table includes a column 7001 of a disassembling start component, a column 7003 of a component to be exchanged, a column 7005 of a parent item number, and a column 7007 of a disassembling procedure code. The initial state of the first work state storage 513 includes data shown in a line 7011 in FIG. 7, for example. Incidentally, "-" indicates that data is not stored in the column. The item number identified by the error cause identifying unit 505 or the disassembling target component identifying unit 511 is stored in the column 7001 of the disassembling start component and the column 7003 of the component to be exchanged. "1" as an initial value is set to the column 7001 of the disassembling start component. The parent item number of the component to be exchanged is stored in the column 7005 of the parent item number. The disassembling procedure code identified to be extracted is stored into the column 7007 of the disassembling procedure code. At the stage of the step S9, data is not set in the column 7005 of the parent item number and the column 7007 of the disassembling procedure code.

Figure 8:
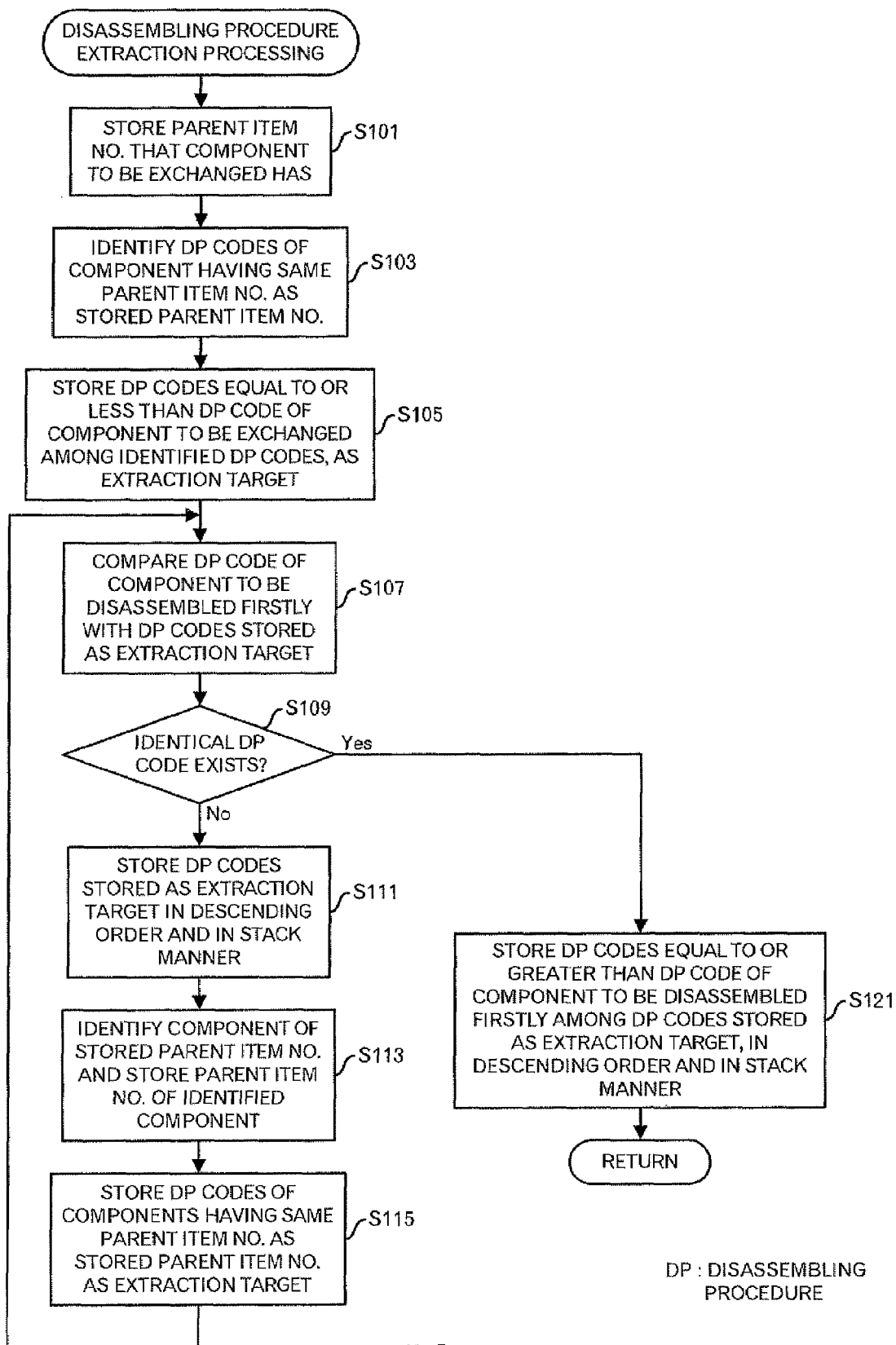
FIG. 8 is a diagram showing a processing flow of a disassembling procedure extraction processing.

Next, the disassembling procedure extraction processing is carried out (step S11). The details of the disassembling procedure extraction processing will be explained by using FIG. 8. Here, a case will be explained where the item number "8" is stored in the column 7003 of the component to be exchanged in the table stored in the first work state storage 513, and the item number "1" is stored as an initial value in the column 7001 of the disassembling start component. The disassembling procedure extractor 515 refers to the procedure table 537 to identify the parent item number of the component to be exchanged, and stores the identified parent item number into the work state storage 513 (step S101). Next, the disassembling procedure extractor 515 refers to the procedure table 537 to identify the disassembling procedure codes of the components having the same parent item number as the stored parent item number (step S103). In this embodiment, "5", which is the parent item number of the component to be exchanged, is identified, and furthermore, the disassembling procedure codes of the components of the item numbers "8" to "22", which have the same parent item number, are identified.

Next, the disassembling procedure extractor 515 stores the disassembling procedure code of the component to be exchanged and the disassembling procedure codes less than the disassembling procedure code of the component to be exchanged among the identified disassembling procedure codes, as the disassembling procedure codes to be extracted, into the first work state storage 513 (step S105). The disassembling procedure codes can be compared based on the values of the parent item numbers included in the codes and the values of the disassembling numbers included in the codes. In this embodiment, the disassembling procedure code of the component to be exchanged is "Mov5-1D", and there is no disassembling procedure code less than the disassembling procedure code of the component to be exchanged among the identified disassembling procedure codes "Mov5-1D" to "Mov5-7D". Therefore, "Mov5-1D", which is the disassembling procedure code of the component to be exchanged, is stored in the first work state storage 513. As a result, for example, data as shown in the line 7021 of FIG. 7 is stored in the first work state storage 513.

Next, the disassembling procedure extractor 515 compares the disassembling procedure codes stored in the first work state storage 513 as the extraction target with the disassembling procedure code of the disassembling start component (step S107) The disassembling procedure extractor 515 judges whether or not an identical disassembling code exists (step S109). When the condition at the step S109 is not satisfied (step S109: No route), the disassembling procedure extractor 515 stores the disassembling procedure codes stored in the first work state storage 513 in a descending order and in a stack manner into the first work disassembling procedure storage 517 (step S111). In this embodiment, as shown in the line 7021 of FIG. 7, for example, when the disassembling procedure code stored in the first work state storage 513 is "Mov5-1D", the disassembling procedure code of the disassembling start component is "* (no applicable data)". Therefore, it is judged that the condition in the step S109 is not satisfied. Therefore, the step S111 is executed, and "Mov5-1D" is stored into the first disassembling procedure storage 517. Next, the disassembling procedure extractor 515 reads out the parent item number stored in the first work state storage 513, refers to the procedure table 537 to identify the component corresponding to the parent item number, and stores the parent item number of that component into the first work state storage 513 (step S113). In this embodiment, because the stored parent item number is "5", the component of the item number "5" is identified and the parent item number "1" of that component is stored.

Next, the disassembling procedure extractor 515 refers to the procedure table 537 to identify the components having the same parent item number as the stored parent item number, and stores the disassembling procedure codes of those components as the extraction target into the first work state storage 513 (step S115). In this embodiment, the disassembling procedure extractor 515 identifies the components of the item numbers "2" to "7" having the same parent item number, and stores the data of the disassembling procedure codes "Mov1-1D" to "Mov1-4D" of the components into the first work state storage 513. As a result, for example, data as shown in the line 7031 of FIG. 7 is stored in the first work state storage 513. After that, the processing returns to the step S107, and the processing is repeated until the condition in the step S109 is satisfied.

When the condition at the step S109 is satisfied (step S109: Yes route), the disassembling procedure extractor 515 stores the disassembling procedure code of the disassembling start component and the disassembling procedure codes greater than the disassembling procedure code of the disassembling start component among the stored disassembling procedure codes in a descending order and in a stack manner into the first disassembling procedure storage 517 (step S121). In this embodiment, for example, as shown in the line 7041 of FIG. 7, when the disassembling procedure code stored in the first work state storage 513 is "* (no applicable data)", because the disassembling procedure code of the disassembling start component is "* (no applicable data)", it is judged that the condition at the step S109 is satisfied. However, because the data of "* (no applicable data)" is not used in the following processing in the step S121, data is not stored in the first disassembling procedure storage 517. By carrying out the disassembling procedure extraction processing, the work steps necessary for the disassembling work can be identified along with the work procedure to be carried out only by designating information of the disassembling start components and information of the component to be exchanged.

The data shown in FIG. 7 is stored in the first disassembling procedure storage 517 as data shown in FIG. 9 by executing the step S111 and S121. In the example shown in FIG. 9, the disassembling procedure codes are stored in the first disassembling procedure storage 517 in an order that the top is the disassembling procedure code 9001 of the disassembling start component and the bottom is the disassembling procedure code 9009 of the component to be exchanged. When the data is read out from the first disassembling procedure storage 517, data is read out from the data at the top, that is, the disassembling procedure code 9001 of the disassembling start component in this embodiment.

Figure 6:
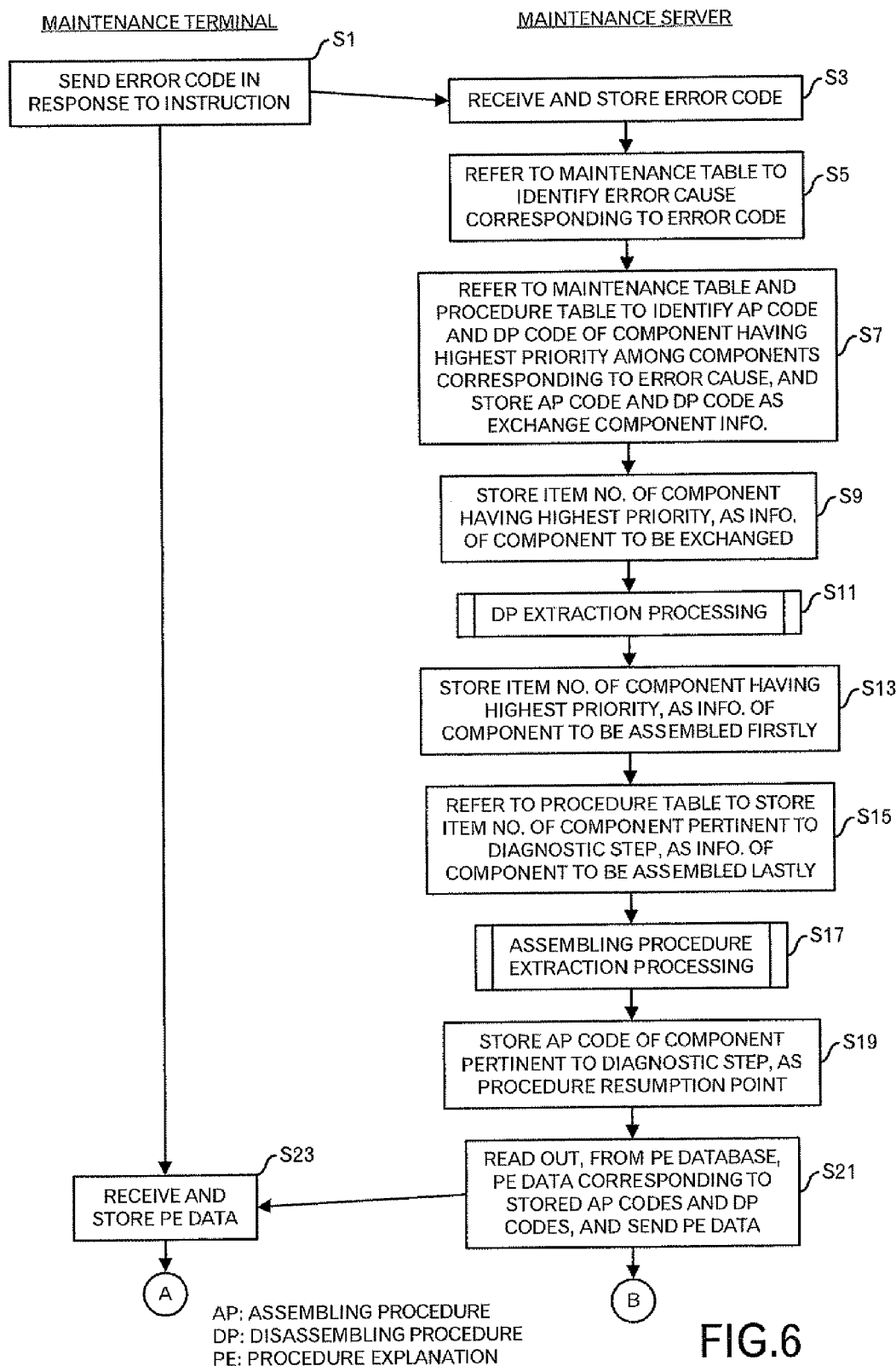
FIG. 6 is a diagram showing a processing flow in the embodiment of this invention.

Returning to the explanation of the processing in FIG. 6, the assembling target component identifying unit 521 refers to the exchange component information storage 531 and the procedure table 537 to identify the item number of the component whose priority degree is the highest among the components to be exchanged, which correspond to the error cause, and stores the identified item number, as information of the component to be firstly assembled, into the second work state storage 523 (step S13). Next, the assembling target component identifying unit 521 refers to the procedure table 537 to identify the item number of the component corresponding to the diagnostic step for the component whose priority degree is the highest, and stores the identified item number, as the component to be assembled lastly, into the second work state storage 523 (step S15). In this embodiment, the item number of the component whose priority degree is the highest is "8", and in the example of the procedure table 537 shown in FIG. 4, it is identified that the item number of the component that "1" is input in the column of the diagnostic step is "5".

FIG. 10 shows an example of data stored in the second work state storage 523. In the example of FIG. 10, a table in which the data used in the assembling procedure extraction processing is temporarily stored is stored in the second work state storage 523, and the table includes a column 1001 of the component to be assembled lastly, a column 1003 of the component to be assembled firstly, and a column 1007 of the assembling procedure code. The initial state of the second work state storage 523 has data as shown in the line 1011 of FIG. 10, for example. Incidentally, "-" indicates that data is not stored in the column. The item numbers identified by the assembling target component identifying unit 521 are stored in the column 1001 of the component to be assembled lastly and the column 1003 of the component to be assembled firstly. "1" is set, as an initial value, into the column 1001 of the component to be assembled lastly. The parent item number of the component to be assembled firstly is stored into the column 1005 of the parent item number. The assembling procedure code identified as the extraction target is stored into the column 1007 of the assembling procedure code. At the stage of the step S15, data is not set in the column 1005 of the parent item number and the column 1007 of the assembling procedure code.

Figure 11:
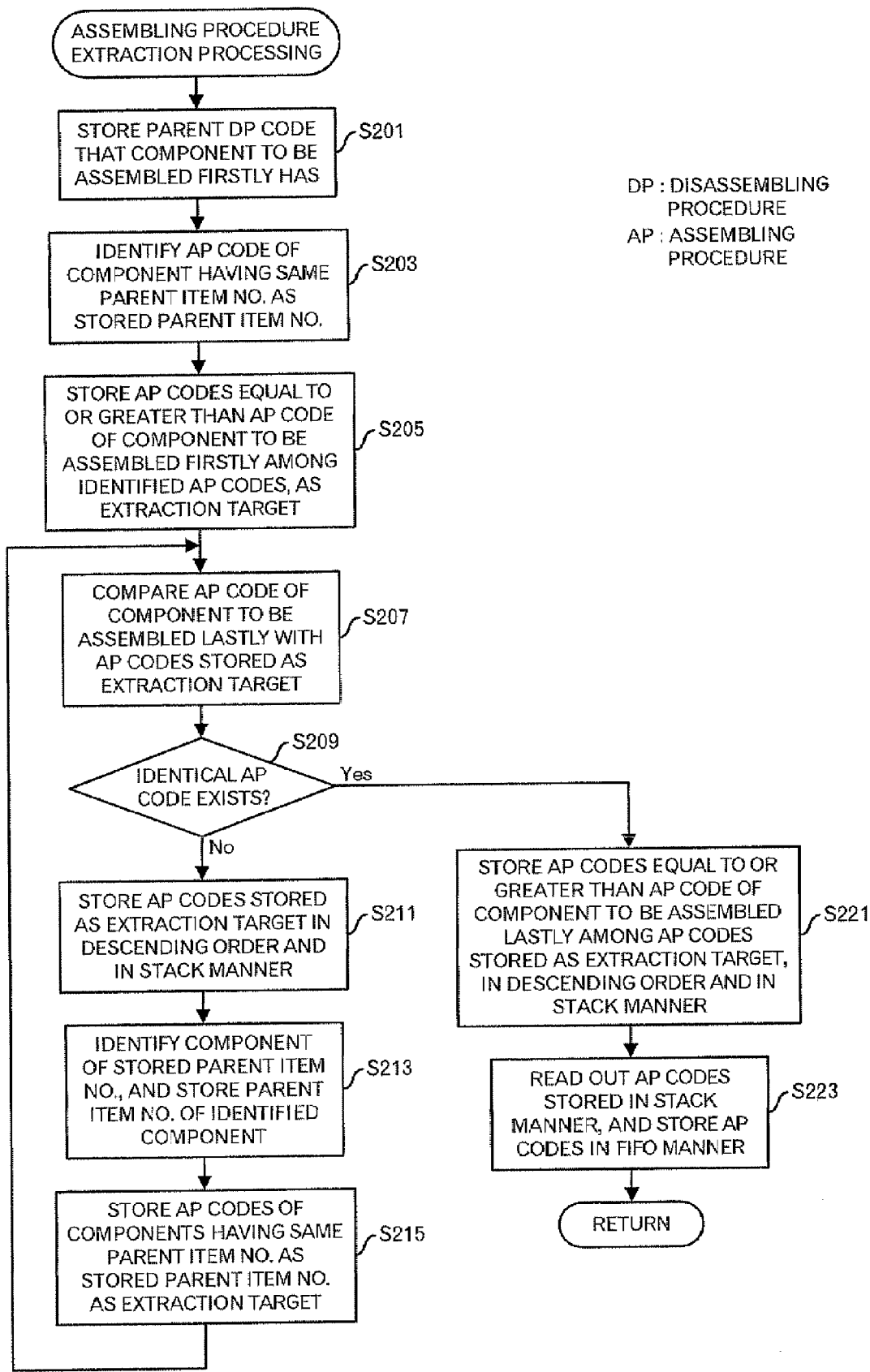
FIG. 11 is a diagram showing a processing flow of an assembling procedure extraction processing.

Next, an assembling procedure extraction processing is carried out (step S17). The details of the assembling procedure extraction processing will be explained by using FIG. 11. Here, a case will be explained where the item number "27" is stored in the column 1003 of the component to be assembled firstly in the table stored in the second work state storage 523, and the item number "5" is stored in the column 1001 of the component to be assembled lastly. The assembling procedure extractor 525 refers to the procedure table 537 to identify the parent item number of the component to be assembled firstly, and stores the parent item number into the second work state storage 523 (step S201). Next, the assembling procedure extractor 525 refers to the procedure table 537 to identify the assembling procedure code of the component having the same parent item number as the stored parent item number (step S203). In this embodiment, "22", which is the parent item number of the component to be assembled firstly, is identified, and furthermore, the assembling procedure codes of the components of the item numbers "23" to "27", which have the same parent item number, are identified.

Next, the assembling procedure extractor 525 stores the assembling procedure code of the component to be assembled firstly and the assembling procedure codes less than the assembling procedure code of the component to be assembled firstly, as the assembling procedure codes to be extracted, into the second work state storage 523 (step S205). The assembling procedure code can be compared based on a value of the parent item number included in the code and a value of the assembling number included in the code. In this embodiment, because the assembling procedure code of the component to be assembled firstly is "Mov22-2A" and the identified assembling procedure codes are "Mov22-1A" and "Mov22-2A", "Mov22-2A" and "Mov22-1A" are stored in the second work state storage 523. As a result, data as shown in the line 1021 of FIG. 10 is stored in the second work state storage 523.

Next, the assembling procedure extractor 525 compares the assembling procedure code stored in the second work state storage 523 as the extraction target with the assembling procedure code of the component to be assembled lastly (step S207). The assembling procedure extractor 525 judges whether or not an identical assembling procedure code exists (step S209) When the condition at the step S209 is not satisfied (step S209: No route), the assembling procedure extractor 525 stores the assembling procedure code stored in the second work state storage 523 in a descending order and in a stack manner into the assembling procedure storage 527 (step S211). In this embodiment, for example, as shown in a line 1021 of FIG. 10, when the assembling procedure codes stored in the second work state storage 523 are "Mov22-1A" and "Mov22-2A", because the assembling procedure code of the component to be assembled lastly is "Mov-3A", it is judged that the condition at the step S209 is not satisfied. Therefore, the step S211 is executed, and, first, "Mov22-2A" and next, "Mov22-1A" are stored into the assembling procedure storage 527. Next, the assembling procedure extractor 525 reads out the parent item number stored in the second work state storage 523, and refers to the procedure table 537 to identify the component corresponding to the parent item number, and stores the parent item number of the identified component into the second work state storage 523 (step S213). In this embodiment, because the stored parent item number is "22", the component of the item number "22" is identified, and the parent item number "5" of that component is stored.

Next, the assembling procedure extractor 525 refers to the procedure table 537 to identify the component having the same parent item number as the stored parent item number, and stores the assembling procedure code of that component as the extraction target into the second work state storage 523 (step S215). In this embodiment, the components of the item numbers "8" to "22", which have the same parent item number, are identified, and data of the assembling procedure codes "Mov5-1A" to "Mov5-7A" of those components is stored in the second work state storage 523. As this result, data as shown in the line 1031 of FIG. 10 is stored in the second work state storage 523. After that, the processing returns to the step S207, and the processing is repeated until the condition at the step S209 is satisfied.

When the condition at the step S209 is satisfied (step S209: Yes route), the assembling procedure extractor 525 stores the assembling procedure code of the component to be assembled lastly and the assembling procedure codes greater than the assembling procedure code of the component to be assembled lastly in a descending order and in a stack manner into the assembling procedure storage 527 (step S221). In this embodiment, for example, as shown in the line 1041 of FIG. 10, when the assembling procedure codes stored in the second work state storage 523 are "Mov1-1A" to "Mov1-4A", because the assembling procedure code of the component to be assembled lastly is "Mov1-3A", it is judged that the condition at the step S209 is satisfied. The assembling procedure code greater than the assembling procedure code of the component to be assembled lastly among the assembling procedure codes stored in the second work state storage 523 is "Mov1-4A". Therefore, the step S221 is executed, and the assembling procedure codes are stored in an order of, first "Mov1-4A" and, next, "Mov1-3A". Furthermore, because the assembling procedure codes are used in a descending order of the numbers, the assembling procedure extractor 525 stores data of the stored assembling procedure codes so that they are arranged in a descending order (step S223). Incidentally, because data of "*" (no applicable data)" is not used at the step S221 in the following processing, the data is not stored in the assembling procedure storage 527. By carrying out the assembling procedure extraction processing, it becomes possible to identify the work steps necessary for the assembling work along with the work procedure to be carried out, only by designating information of the component to be assembled firstly and information of the component to be assembled lastly.

The data shown in FIG. 10 is stored in the assembling procedure storage 527, as data shown in FIG. 12, by executing the steps S211 and S221. In the example of FIG. 12, the assembling procedure codes are stored into the assembling procedure storage 527 in such an order that the top is the assembling procedure code 1201 of the component to be assembled firstly and the bottom is the assembling procedure code 1209 of the component to be assembled lastly. When data is read out from the assembling procedure storage 527, the data is read out in turn from the data stacked on the top, that is, the assembling procedure code 1201 of the assembling start component in this embodiment.

Figure 14:
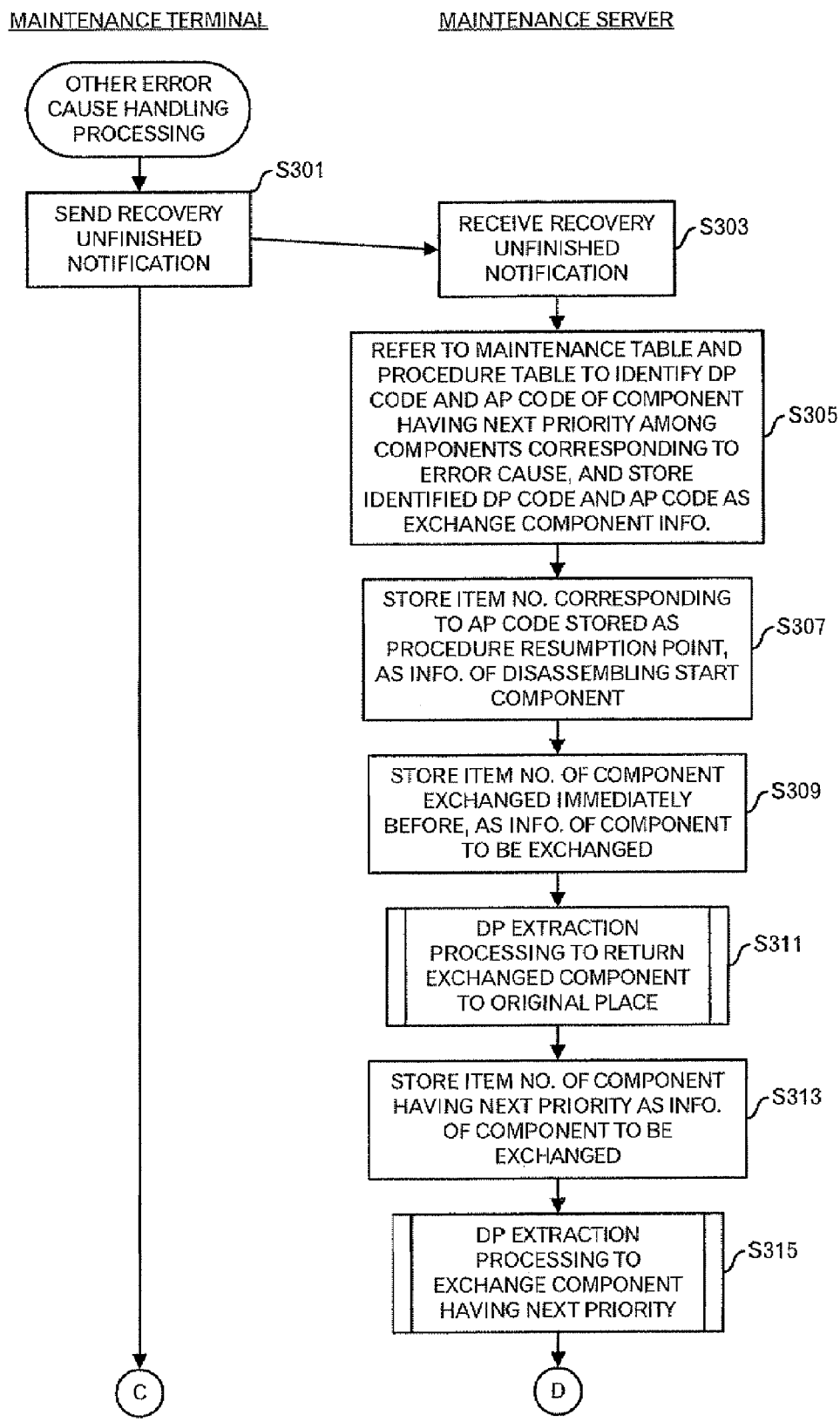

Returning to the explanation of the processing of FIG. 6, the assembling target component identifying unit 521 refers to the order table 537 to store the assembling procedure code of the component pertinent to the diagnostic step for the component whose priority degree is the highest as information used in step S41 or the processing to be explained later by using FIG. 14, into the procedure resumption point storage 535 (step S19).

Next, the procedure explanation data extractor 541 refers to the disassembling procedure code stored in the first disassembling procedure storage 517 and the assembling procedure code stored in the assembling procedure storage 527 to read out the procedure explanation data corresponding to the disassembling procedure code and the assembling procedure code from the procedure explanation database 543. The procedure explanation data transmitter 545 transmits the read procedure explanation data to the maintenance terminal 3 (step S21) Incidentally, the processing shifts to a flow of FIG. 13 through a terminal B.

The maintenance terminal 3 receives the procedure explanation data from the maintenance server 5, and stores the procedure explanation data into a storage device (step S23). Incidentally, the processing shifts to a flow of FIG. 13 through a terminal A.

Figure 13:
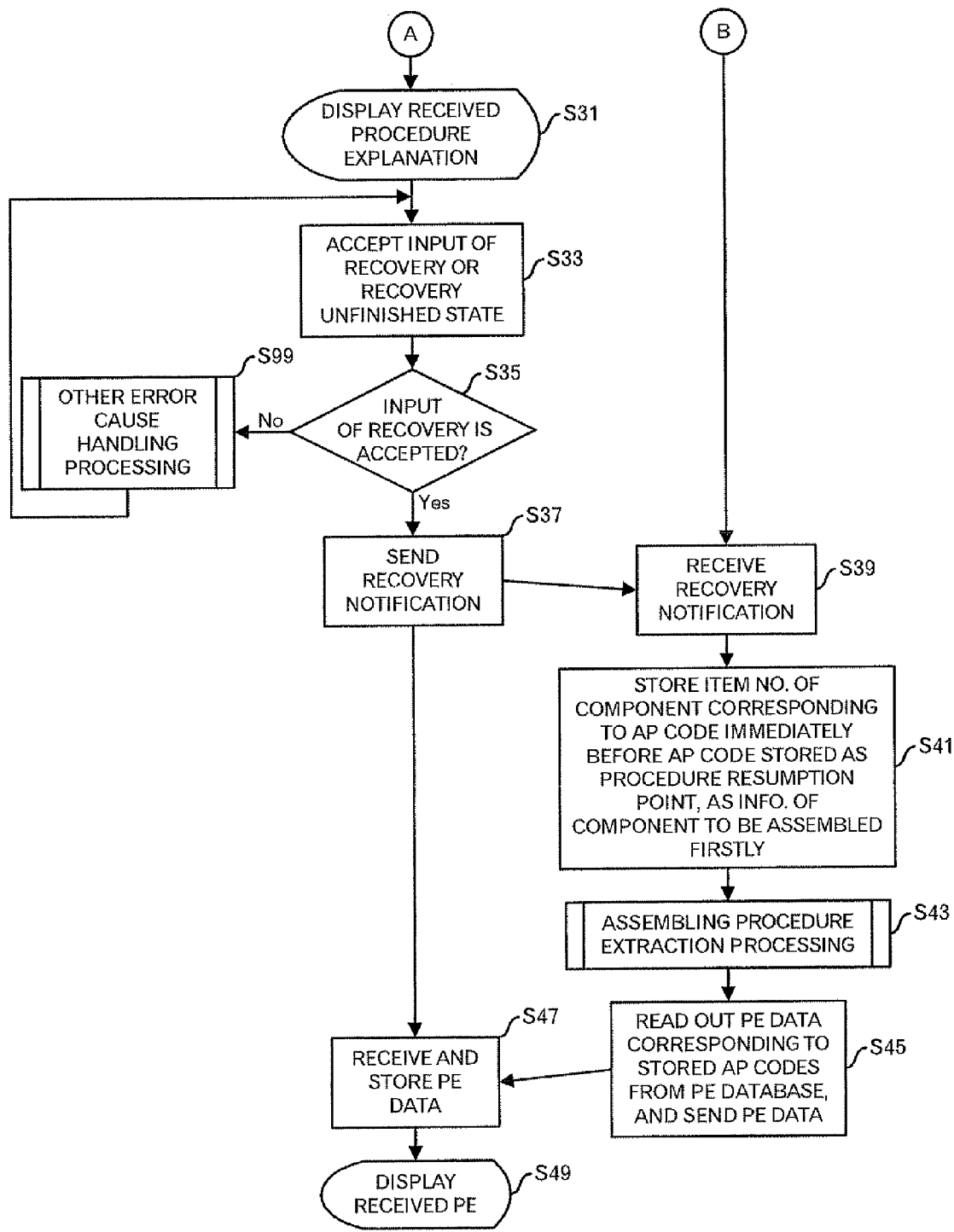
FIG. 13 is a diagram showing a processing flow in the embodiment of this invention.

Next, the processing of FIG. 13 will be explained. The maintenance terminal 3 displays the received procedure explanation data on a display device (step S31). After that, the maintenance terminal 3 receives an input of the recovery or an input of the recovery unfinished state from the user (step S33). When the input of the recovery is accepted (step S35: Yes route), the maintenance terminal 3 transmits a recovery notification to the maintenance server 5 (step S37).

When the recovery notification receiver 551 of the maintenance server 5 receives the recovery notification from the maintenance terminal 3, the receiver notification receiver 551 notifies the assembling target component identifying unit 521 that the notification was received (step S39). The assembling target component identifying unit 521 reads out the assembling procedure code stored in the procedure resumption point storage 535, and stores the item number of the component, which corresponds to the assembling procedure code in the immediately preceding order of the read assembling procedure code, as information to be assembled firstly, into the second work state storage 523 (step S41). As for the information of the component to be assembled lastly, the item number "1" as the initial value is used. Next, the assembling procedure extraction processing is carried out (step S43). The details of the assembling procedure extraction processing is as explained by using FIG. 11.

Then, the procedure explanation data extractor 541 refers to the assembling procedure code stored in the assembling procedure storage 527 to read out the procedure explanation data corresponding to the assembling procedure code from the procedure explanation database 543. The procedure explanation data transmitter 545 transmits the read procedure explanation data to the maintenance terminal 3 (step S45).

The maintenance terminal 3 receives the procedure explanation data from the maintenance server 5, and stores the procedure explanation data into the storage device (step S47). Then, the maintenance terminal 3 displays the stored procedure explanation data on the display device (step S49). By carrying out the work according to the display of the explanation data of the work procedure identified by this system, it is possible to efficiently carry out the exchange work of the component.

At the step S33, when the input of the recovery unfinished state is accepted from the user (step S35: No route), an other error cause handling processing is carried out (step S99). In the other error cause handling processing, in order to exchange the next component to be exchanged, it is necessary to firstly identify the work procedure to return the component exchanged immediately before. The details of the other error cause handling processing will be explained by using FIGS. 14 to 23. The maintenance terminal 3 transmits the recovery unfinished notification to the maintenance server 5 (step S301). The recovery unfinished notification receiver 553 of the maintenance server 5 receives the recovery unfinished notification, and outputs a processing instruction to the error cause identifying unit 505 (step S303). The error cause identifying unit 505 refers to the error code storage 503, the maintenance table 507 and the procedure table 537 to identify the component whose priority degree is the highest next to the priority degree of the component exchanged immediately before among the components corresponding to the error cause, and stores the disassembling procedure code and the assembling procedure code of the identified component, as information of the component having the next priority degree, into the exchange component information storage 531 (step S305). In this embodiment, by referring to the maintenance table 507 shown in FIG. 5, it is identified that the component, which corresponds to the error cause "memory error" and has the next priority degree, is "CPU board". Incidentally, the exchange component information storage 531 holds, at this timing, both of the information of the component exchanged immediately before and the information of the component having the next priority degree.

The disassembling target component identifying unit 511 reads out the assembling procedure code from the procedure resumption point storage 535, and refers to the procedure table 537 to identify the item number corresponding to the identified assembling procedure code, and stores the identified item number, as information of the assembling start component, into the first work state storage 513 (step S307). Next, the disassembling target component identifying unit 511 reads out the assembling procedure code of the component exchanged immediately before from the exchange component information storage 531, and refers to the procedure table 537 to identify the item number of that component, and stores the item number, as information of the component to be exchanged, into the first work state storage 513 (step S309).

Next, the disassembling target component identifying unit 511 carries out the disassembling procedure extraction processing to return the component exchanged immediately before to the original place, and stores the processing result into the second disassembling procedure storage 519 (step S311). The details of the disassembling procedure extraction processing is as explained by using FIG. 8. In this embodiment, because the item number of the disassembling start component is "5", and the item number of the component to be exchanged is "8" the disassembling procedure codes to be stored in the second disassembling procedure storage 519 as a result of the disassembling procedure extraction processing are "Mov1-3D" to "Mov5-1D".

Next, the disassembling target component identifying unit 511 reads out the assembling procedure code of the component having the next priority degree from the exchange component information storage 531, and refers to the procedure table 537 to identify the item number of that component, and stores the item number, as information of the component to be exchanged, into the first work state storage 513 (step S313). As for the information of the disassembling start component, the item number "1" as an initial value is used. Then, the disassembling target component identifying unit 511 carries out the disassembling procedure extraction processing to exchange the component having the next priority degree, and stores the processing result into the first disassembling procedure storage 517 (step S315). The details of the disassembling procedure extraction processing is as explained by using FIG. 8. In this embodiment, because the item number of the disassembling start component is "1", and the item number of the component to be exchanged is "27", the disassembling procedure codes stored in the first disassembling procedure storage 517 as a result of the disassembling procedure extraction processing are "Mov1-1D" to "Mov22-2D". Incidentally, the processing of the maintenance server 5 shifts to a flow of FIG. 15 through a terminal D, and the processing of the maintenance terminal 3 shifts to a flow of FIG. 20 through a terminal C.

Figure 15:
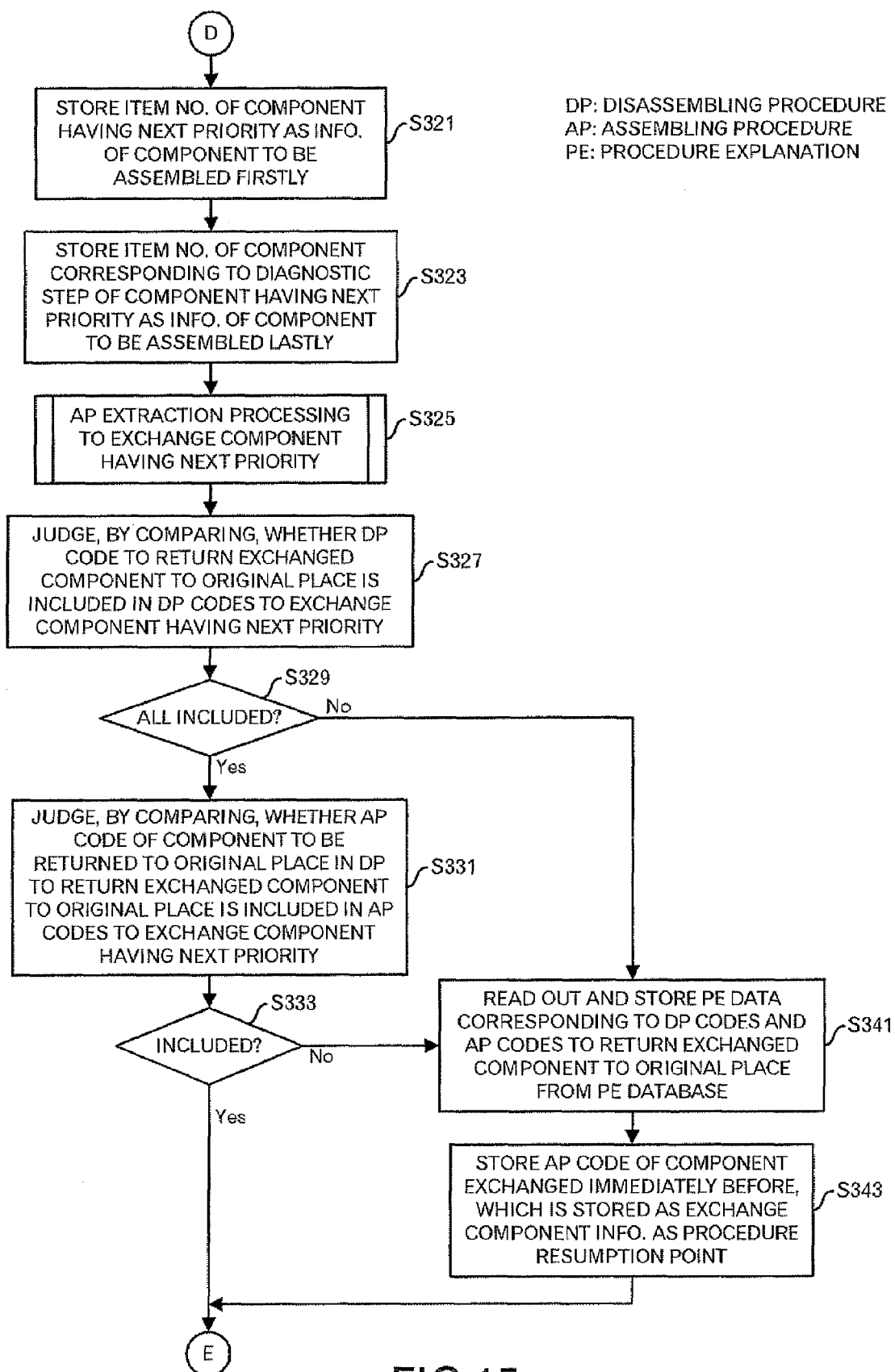

Next, the processing of FIG. 15 will be explained. The assembling target component identifying unit 521 reads out the assembling procedure code of the component having the next priority degree from the exchange component information storage 531, and refers to the procedure table 537 to identify the item number corresponding to the assembling procedure code, and stores the identified item number, as the information of the component to be assembled firstly, into the second work state storage 523 (step S321). Next, the assembling target component identifying unit 521 refers to the procedure table 537 to identify the item number of the component corresponding to the diagnostic step for the component having the next priority degree, and stores the identified item number, as the information of the component to be assembled lastly, into the second work state storage 523 (step S323). The assembling target component identifying unit 521 carries out the assembling procedure extraction processing, and stores the processing result into the comparison result storage 567 (step S325). The details of the assembling procedure extraction processing is as explained by using FIG. 11. In this embodiment, because the item number of the component having the next priority degree is "27", and the item number of the component corresponding to the diagnostic step for that component is "5", the assembling procedure codes stored in the assembling procedure storage 527 as a result of the assembling procedure extraction processing are "Mov1-3A" to "Mov22-2A". Incidentally, the processing from the steps S307 to S311, the processing from the steps S313 and S315, and the processing from the steps S321 to S325 are respectively executable independently, and they may be executed in parallel, and the order may be exchanged.

Figure 16:
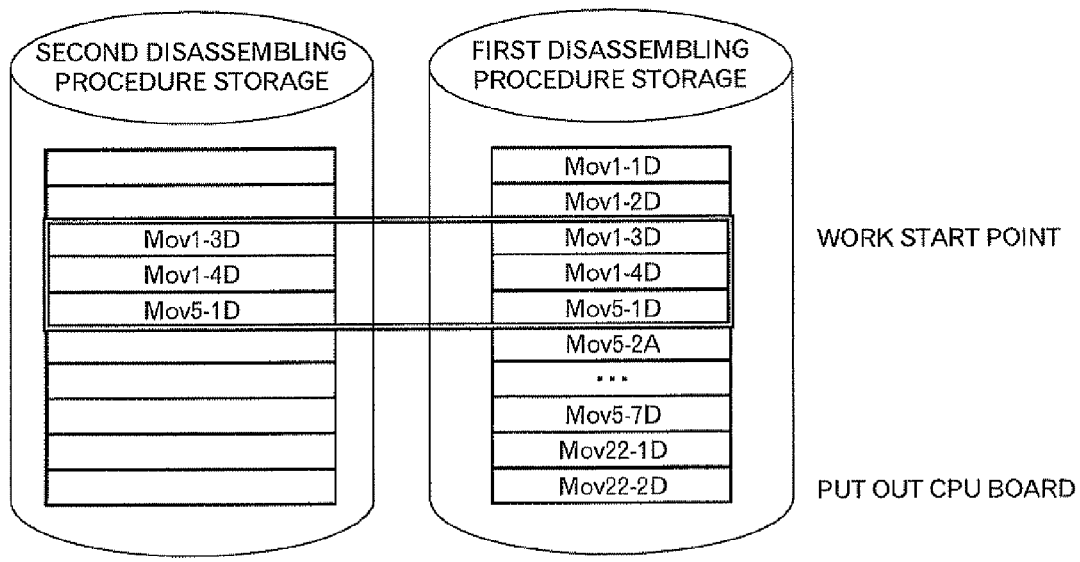
Figure 17:
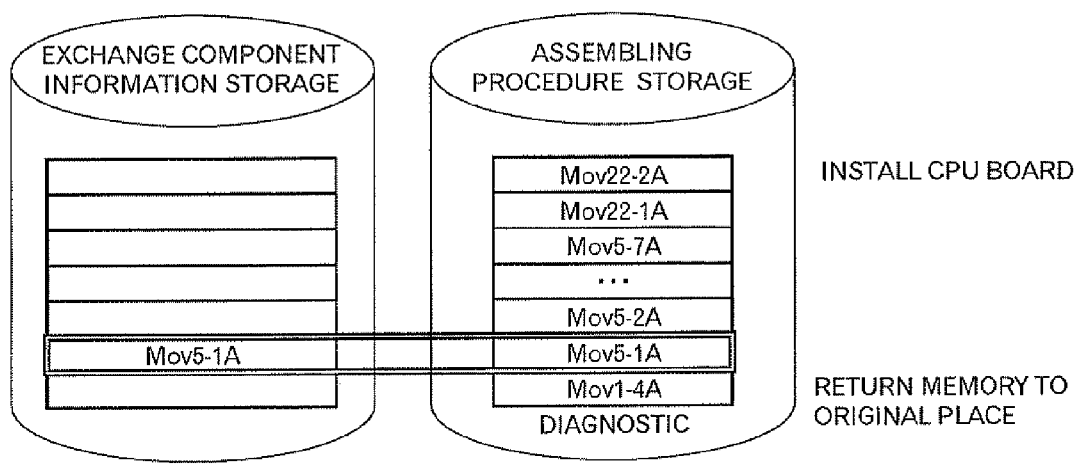

The first procedure comparator 561 reads out the disassembling procedure codes stored in the second disassembling procedure storage 519, and judges, by comparing, whether or not the read disassembling procedure codes are included in the disassembling procedure codes stored in the first disassembling procedure storage 517 (steps S327 and S329). When the condition at the step S329 is satisfied (step S329: Yes route), the first procedure comparator 561 reads out the assembling procedure code of the component exchanged immediately before from the exchange component information storage 531, and judges, by comparing, whether or not the read assembling procedure code is included in the assembling procedure codes stored in the comparison result storage 567 (steps S331 and S333). When the condition at the step S333 is satisfied (step S333: Yes route), it means that the work to return the component exchanged immediately before to the original place can be included in the work to exchange the component having the next priority degree and can be carried out together. Therefore, it is possible to identify the efficient work procedure in which the work procedure to return the component exchanged immediately before to the original place is omitted. Incidentally, the processing shifts to a flow of FIG. 20 through a terminal E. In this embodiment, because the disassembling procedure codes stored in the second disassembling procedure storage 519 are "Mov1-3D" to "Mov5-1D", and the those disassembling procedure codes are included in the disassembling procedure code "Mov1-1D" to "Mov22-2D", which are stored in the first disassembling procedure storage 517 as shown in FIG. 16, the condition at the step S329 is satisfied. In addition, because the assembling procedure code of the component exchanged immediately before is "Mov5-1A", and this assembling procedure code is included in the assembling procedure codes "Mov1-4A" to "Mov22-2A", which are stored in the assembling procedure storage 527 as shown in FIG. 17, the condition at the step S333 is also satisfied.

Figure 18:
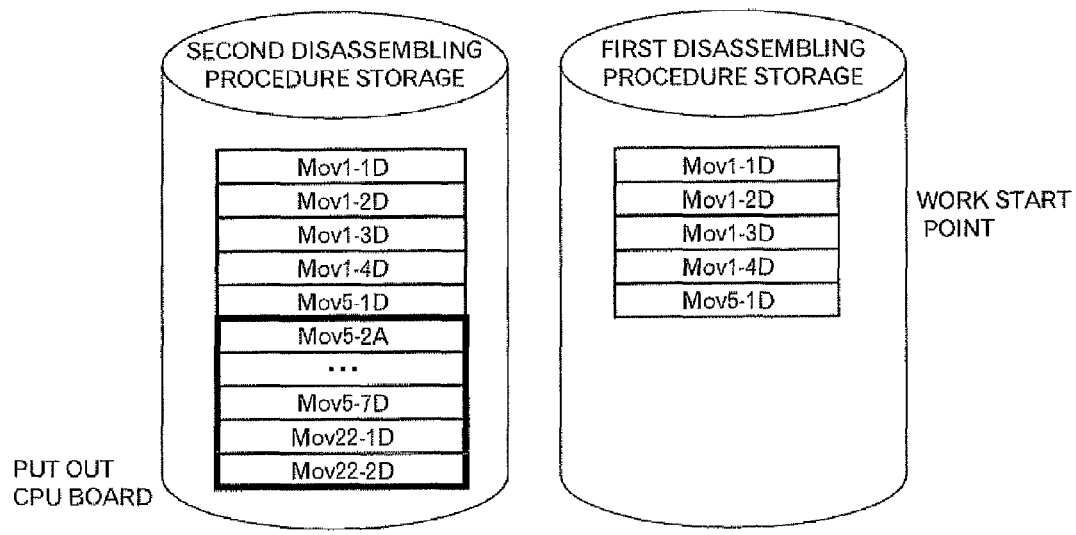
Figure 19:
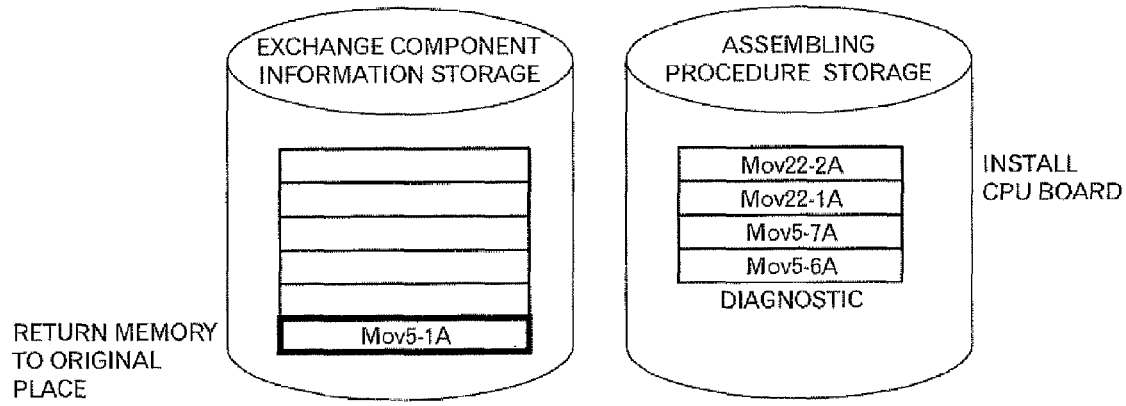

When the condition at the step S329 is not satisfied (step S329. No route), or when the condition at the step S333 is not satisfied (S333: No route), it is necessary to identify the work procedure to return the component exchanged immediately before to the original place because the component exchanged immediately before cannot be returned to the original place in the work procedure to exchange the component having the next priority degree. In this embodiment, although it is supposed that, for example, the memory module is firstly exchanged, and then the CPU board is exchanged, it is also supposed that the CPU board is firstly exchanged according to the error cause. In this case, for example, as shown in FIG. 18, because the disassembling procedure code for exchanging the CPU board exchanged immediately before is not included in the disassembling procedure codes for exchanging the memory module having the next priority degree, a processing to return the CPU board to the board before the exchange is separately required. In addition, a case can also be supposed where the different diagnostic steps are set for each component to be exchanged, and the assembling procedure code corresponding to the diagnostic step for the component having the next priority degree is greater than the assembling procedure code of the component exchanged immediately before. In such a case, for example, as shown in FIG. 19, it is impossible to return the component exchanged immediately before to the original place in the diagnostic step after exchanging the component having the next priority degree.

In this case, the first procedure comparator 561 stores the disassembling procedure code read out from the second disassembling procedure storage 519 and the assembling procedure codes of the component exchanged immediately before into the comparison result storage 567. The procedure explanation data extractor 541 refers to the comparison result storage 567 to read out the procedure explanation data corresponding to the disassembling procedure code and the assembling procedure codes from the procedure explanation database 543, and stores the read procedure explanation data into the procedure explanation data storage 547 (step S341). Then, the first procedure comparator 561 reads out the assembling procedure code of the component exchanged immediately before from the exchange component information storage 531, and stores, as data used for the processing at step S351 and subsequent steps, the read assembling procedure code into the procedure resumption point storage 535 (step S343). In this embodiment, the procedure explanation data corresponding to the disassembling procedure codes "Mov1-3D" to "Mov5-1D" to return the component of the item number "8", which is the component exchanged immediately before, to the original place, and the assembling procedure code "Mov5-1A" is stored into the procedure explanation data storage 547. In addition, the assembling procedure code "Mov22-2A" read out from the exchange component information storage 531 is stored into the procedure resumption point storage 535. Therefore, even when the work to return the component exchanged immediately before to the original place has to be carried out, separately, it is possible to identify the work procedure, which suppresses the duplication of the work to the minimum without returning to a state before the disassembling starts. Incidentally, the processing shifts to a flow of FIG. 20 through a terminal E.

Next, a processing of FIG. 20 will be explained. The second procedure comparator 563 refers to the procedure table 537 to identify the disassembling procedure code corresponding to the assembling procedure code read out from the procedure resumption point storage 535. Then, the second procedure comparator 563 refers to the first disassembling procedure storage 517 to judge, by comparing, whether or not the identified disassembling procedure code is included in the disassembling procedure codes to exchange the component having the next priority degree (steps S351 and S353). When the condition at the step S353 is satisfied (step S353: Yes route), it means that the disassembling work to exchange the component having the next priority degree can be started from a step of disassembling the component corresponding to the assembling procedure code stored in the procedure resumption point storage 535, that is, the component assembled immediately before. That is, the disassembling procedure corresponding to the disassembling procedure codes less than the disassembling procedure code corresponding to the assembling procedure code read out from the procedure resumption point storage 535 among the disassembling procedure to exchange the component having the next priority degree can be omitted. In this case, the second procedure comparator 563 identifies the disassembling procedure code corresponding to the assembling procedure code read out from the procedure resumption point storage 535 and the disassembling procedure codes greater than that disassembling procedure code, and stores the identified disassembling procedure codes into the comparison result storage 567. The procedure explanation data extractor 541 reads out the procedure explanation data corresponding to the disassembling procedure code stored in the comparison result storage 567 from the procedure explanation database 543 (step S357). In this embodiment, the assembling procedure code "Mov1-3A" is stored in the procedure resumption point storage 535, the disassembling procedure code corresponding to that assembling procedure code is "Mov1-3D". Because that disassembling procedure code is included in the disassembling procedure codes "Mov1-1D" to "Mov22-2D", which are stored in the first disassembling procedure storage 517, the condition at the step S353 is satisfied. Therefore, "Mov1-3D" and "Mov1-4D" to "Mov22-2D" among the disassembling procedure codes stored in the first disassembling procedure storage 517 are stored in the comparison result storage 567.

When the condition at the step S353 is not satisfied (step S353: No route), it means that there is a component, which cannot be assembled in the disassembling work and the assembling work to exchange the component having the next priority degree, among the components disassembled in the disassembling work of the component exchanged immediately before. Therefore, the component, which cannot be assembled, has to be assembled in advance before the work to exchange the next priority degree is started. For example, as shown in FIG. 18, when, first, the CPU board is exchanged, and after the exchanged CPU board is returned to the original place, the memory module is exchanged, the assembling procedure code "Mov22-2A" of the CPU board is stored in the procedure resumption point storage 535, and the disassembling procedure codes to exchange the memory module are "Mov1-1D" to "Mov5-1D". In addition, the assembling procedure to exchange the memory module corresponds to "Mov1-3A" to "Mov5-1A". In this case, because the disassembling procedure and assembling procedure of the memory module do not include the work to assemble the components corresponding to the disassembling procedure codes "Mov5-2D" to "Mov22-1D", it is necessary to carry out the work to assemble the components in advance. In addition, a case is supposed where the disassembling procedure to exchange the component having the next priority degree branches from the disassembling procedure to return the component exchanged immediately before to the original place. For example, a case is also considered where another procedure table as shown in FIG. 21 in addition to the procedure table shown in FIG. 4 is prepared, and the procedure table referenced in the processing to return the component exchanged immediately before to the original place is different from the procedure table referenced in the processing to exchange the component having the next priority degree. In such a case, because there is a component, which cannot be assembled in the processing to exchange the component having the next priority degree, among the components disassembled in the disassembling procedure of the component exchanged immediately before, it is necessary to carry out the disassembling work in advance.

Figure 23:
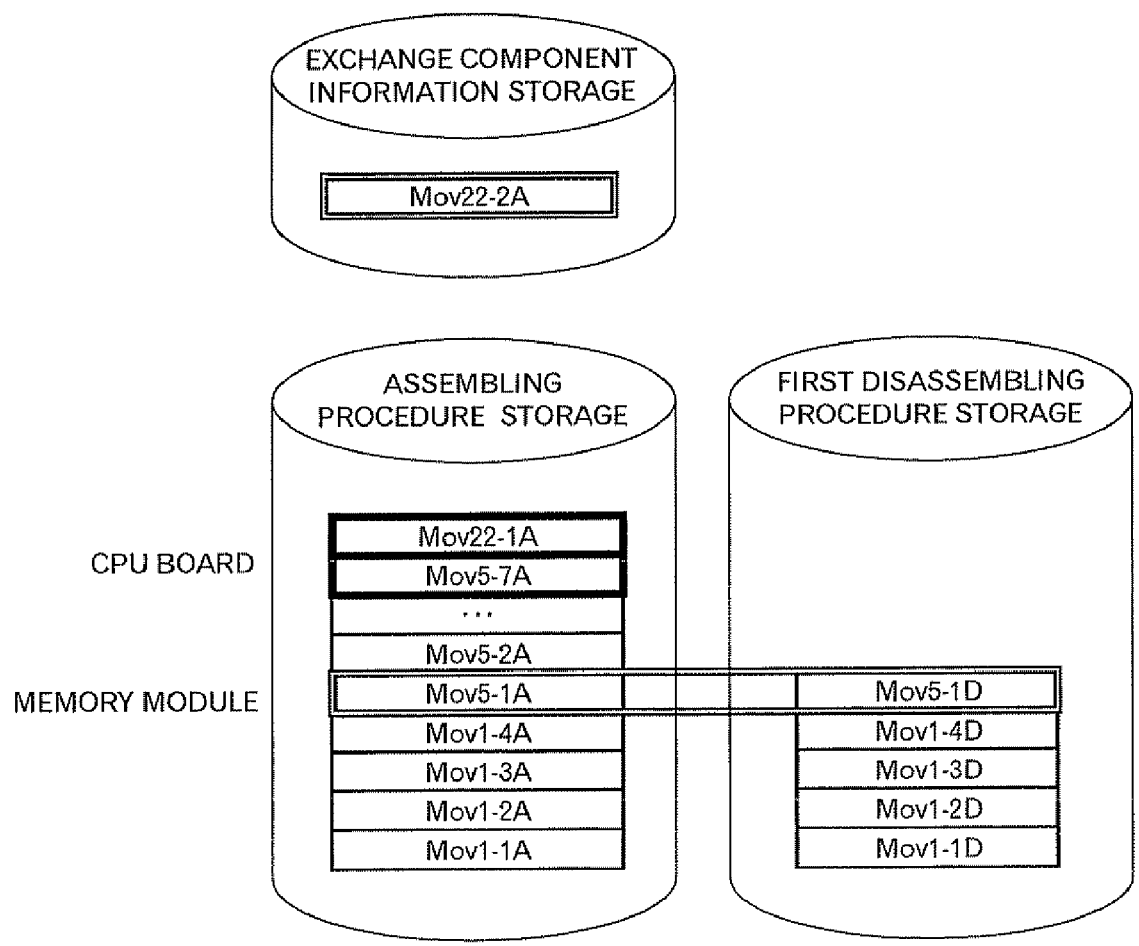

When the condition at the step S353 is satisfied, a re-assembling procedure extraction processing is carried out (step S399). The details of the re-assembling procedure extraction processing will be explained by using FIG. 22. The assembling target component identifying unit 521 refers to the procedure table 537 to identify the item number corresponding to the assembling procedure code in the immediately preceding order of the assembling procedure code read out from the procedure resumption point storage 535, and stores the identified item number, as information of the component to be assembled firstly into the second work state storage 523 (step S401). As for the information of the component to be assembled lastly, the item number "1" as an initial value is used. Then, the assembling target component identifying unit 521 carries out the assembling procedure extraction processing for re-assembling, and stores the processing result into the assembling procedure storage 527 (step S403). The details of the assembling procedure extraction processing are as explained by using FIG. 11. FIG. 23 shows an example where the component exchanged immediately before is the CPU board, and the component having the next priority degree is the memory module. In the example of FIG. 23, the assembling procedure code read out from the procedure resumption point storage 535 is "Mov22-2A", and by referring to the procedure table 537, the item number "26" corresponding to the assembling procedure code "Mov22-1A" immediately before is identified. Because, in the assembling procedure extraction processing for the re-assembling, the item number of the component to be assembled firstly is "26", and the item number of the component to be assembled lastly is "1", the assembling procedure codes from "Mov1-1A" to "Mov22-1A" are stored in the assembling procedure storage 527.

The third procedure comparator 565 reads out the assembling procedure code of the component to be assembled firstly among the assembling procedure codes stored in the assembling procedure storage 527 (step S405) Next, the third procedure comparator 565 refers to the procedure table 537 and the first assembling procedure storage 517 to judge, by comparing, whether or not the disassembling procedure code corresponding to the read assembling procedure code is included in the disassembling procedure codes to exchange the component having the next priority degree (steps S407 and S409). When the condition at the step S409 is not satisfied (step S409: No route), it means that the assembling procedure necessary to start the disassembling work to exchange the component having the next priority degree remains. In this case, in order to identify the necessary assembling procedure, the third procedure comparator 565 reads out the assembling procedure code in the further immediately preceding order of the assembling procedure code used in the processing of the step S407 from the assembling procedure storage 527 (step S411). After that, the processing returns to the step S407, and the processing is repeated until the condition at the step S409 is satisfied. In the example of FIG. 23, because the disassembling procedure code corresponding to the assembling procedure code read out at the step S405 is "Mov22-1D", and the disassembling procedure codes of the components having the next priority degree are "Mov1-1D" to "Mov5-1D", the condition at the step S409 is not satisfied. Therefore, the assembling procedure code "Mov5-7A" in the further immediately preceding order of the assembling procedure code "Mov22-1A" used at the step S407, and the processing returns to the step S407.

When the condition at the step S409 is satisfied (step S409: Yes route), it means that all of the disassembling procedure necessary before the component having the next priority degree can be identified. In this case, the third procedure comparator 565 refers to the assembling procedure storage 527 to identify the assembling procedure codes greater than the assembling procedure code used at the step S407, among the assembling procedure codes for the re-assembling, and stores the identified assembling procedure codes into the comparison result storage 567 (step S421). Next, the third procedure comparator 565 refers to the first disassembling procedure storage 517 to identify the disassembling procedure code greater than the disassembling procedure code used at the step S407, and stores the identified disassembling procedure code into the comparison result storage 567 (step S423). Incidentally, because the component corresponding to the disassembling procedure code, which satisfies the condition, is a component to be disassembled in the disassembling procedure to exchange the component having the next priority degree, it is unnecessary to include that component in the assembling procedure. In the example of FIG. 23, because the condition at the step S409 is satisfied when comparing the disassembling procedure code "Mov5-1D" corresponding to the assembling procedure code "Mov5-1A", "Mov5-2A" to "Mov22-1A" among the assembling procedure codes stored in the assembling procedure storage 527, are stored in the comparison result storage 567. In addition, because the disassembling procedure code greater than "Mov5-1D" is not stored in the first disassembling procedure storage 517, the disassembling procedure code is not stored at the step S423 in the example of FIG. 23. The procedure explanation data extractor 541 reads out the procedure explanation data corresponding to the disassembling procedure codes and assembling procedure codes, which are stored in the comparison result storage 567, from the procedure explanation database 543, and stores the procedure explanation data into the procedure explanation data storage 547 (step S425). By carrying out the re-assembling procedure extraction processing, even when the extra-work of the exchanging work necessarily occurs, it is possible to omit the duplicate work by comparing the assembling procedure to return the component exchanged immediately before to the original place with the disassembling procedure to exchange the component having the next priority degree, and to identify the efficient work procedure.

Figure 20:
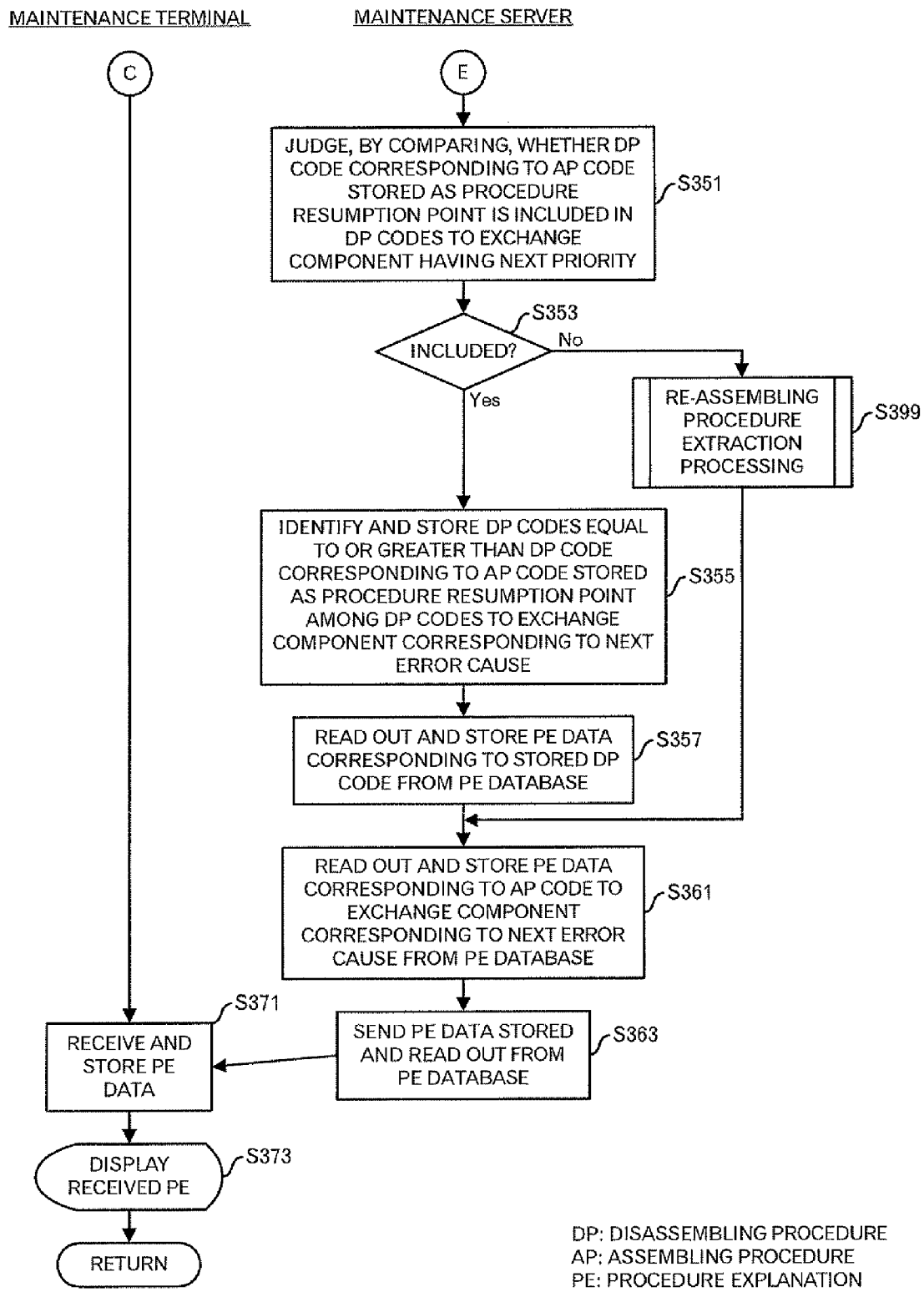
Figure 22:
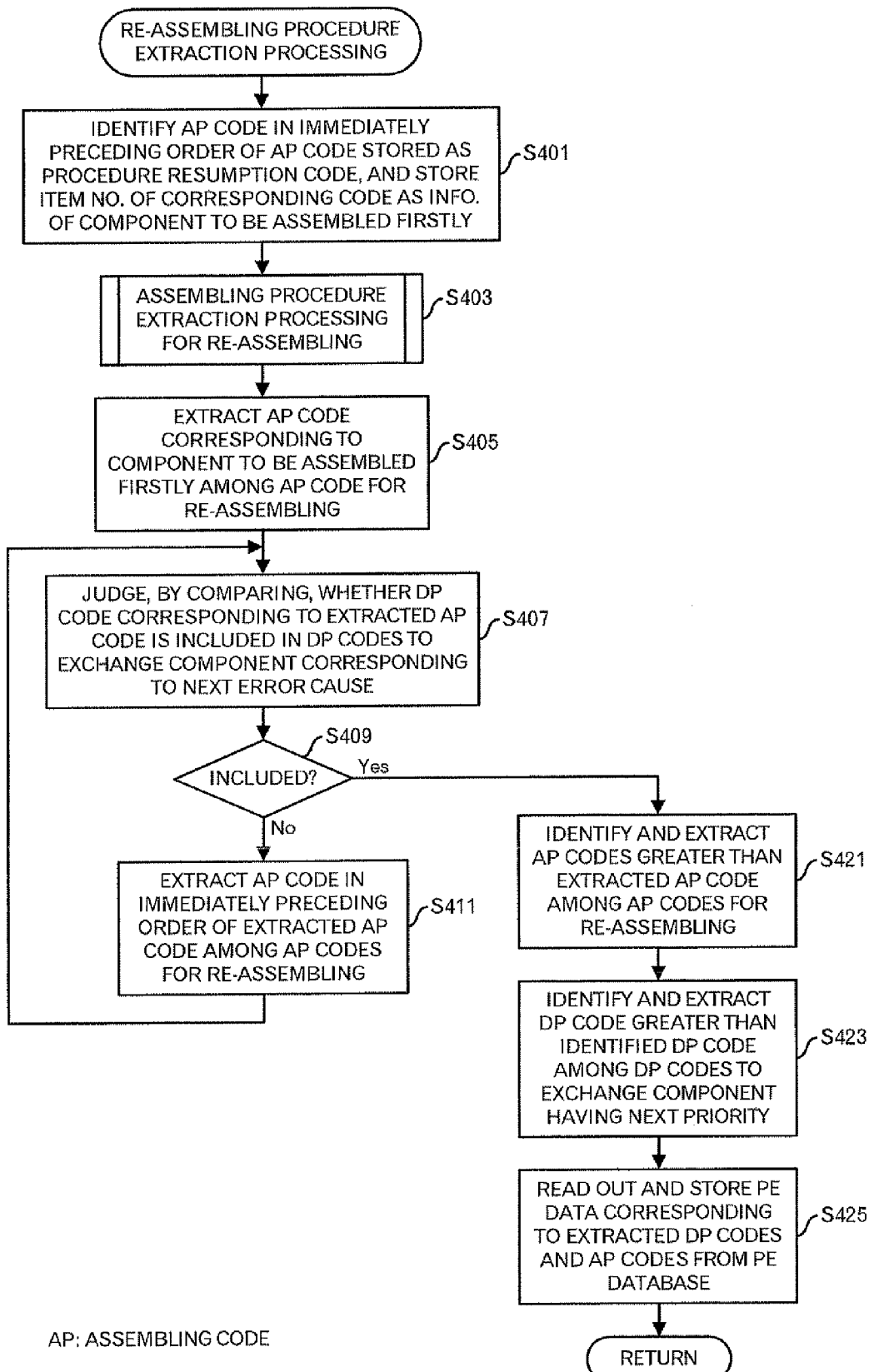

Returning to the explanation of FIG. 20, the procedure explanation data extractor 541 refers to the comparison result storage 567 to read out the procedure explanation data corresponding to the assembling procedure code to exchange the component having the next priority degree, and stores the procedure explanation data into the procedure explanation data storage 547 (step S361). In this embodiment, the procedure explanation data corresponding to the assembling procedure codes "Mov1-3A" to "Mov22-2A", which are stored in the comparison result storage 567, are stored. Then, the procedure explanation data transmitter 545 reads out the procedure explanation data from the procedure explanation data storage 547, and transmits the read data to the maintenance terminal 3 (step S363). In this embodiment, the procedure explanation data corresponding to the disassembling procedure code identified at the step S355 and the assembling explanation data corresponding to the assembling procedure code read out at the step S361 are stored in the procedure explanation data storage 547.

The maintenance terminal 3 receives the procedure explanation data from the maintenance server 5, and stores the data into the storage device (step S371). After that, the maintenance terminal 3 displays the stored procedure explanation data on the display device (step S373). After that, the processing returns to the processing at the step S33.

The procedure explanation data corresponding to the work procedure identified in this embodiment is data including an animation image to explain the shape and a method of moving of the component, for example, for the user. The animation image has been created based on design plan and specification information of the component, which are stored in the component design database 591, for example, and the movable range information of the component, which is stored in the movable part definition database 595, A procedure explanation image using the procedure explanation data is displayed in such a manner that the user can easily identify the component to be worked and the work method, for example, the component to be worked is emphasized. In addition, in order to help the user's understanding, the procedure explanation data may include guidance information such as a voice and sentences. Furthermore, in response to an instruction from the user, an image viewed from a different view point may be displayed, for example. By carrying out the work by using the procedure explanation data, it is possible to reduce the work mistakes, and efficiently advance the work.

Figure 24:
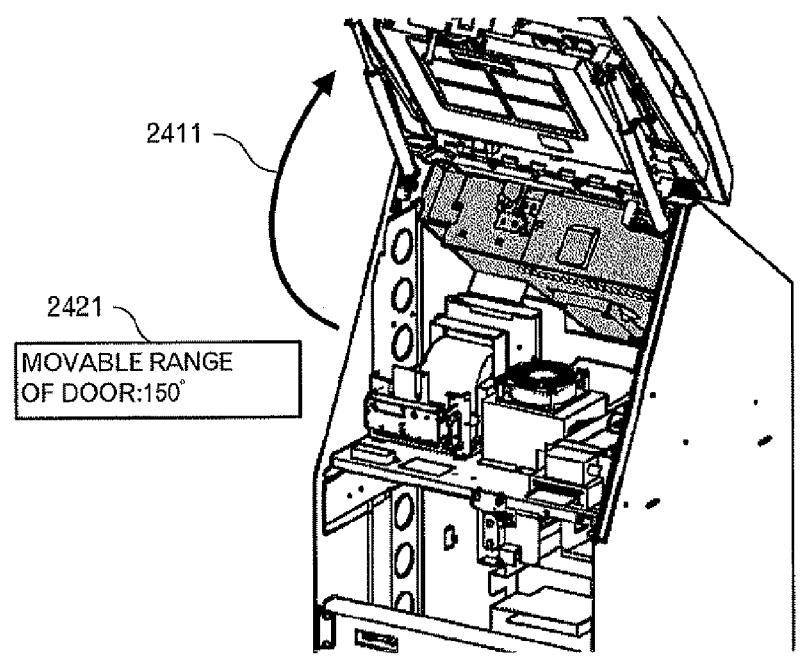
FIG. 24 is a diagram showing an example of a procedure explanation image corresponding to a disassembling procedure code.
Figure 25:
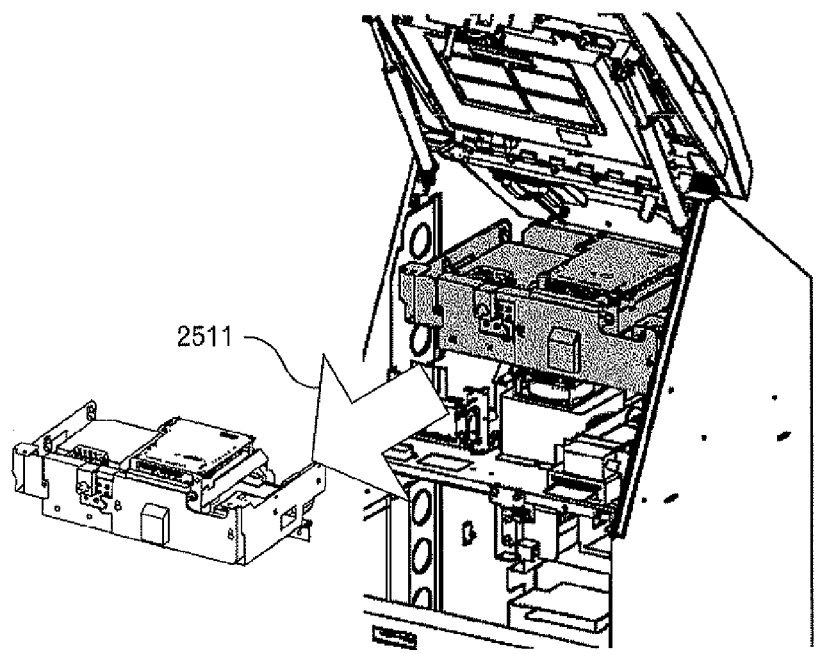
FIG. 25 is a diagram showing an example of the procedure explanation image corresponding to the disassembling procedure code.

An example of the procedure explanation image that the maintenance terminal displays by using the procedure explanation data, and an example of the component exchange work by using the procedure explanation image will be explained by using FIGS. 24 to 28. In the step S31, the procedure explanation image corresponding to the disassembling procedure codes "Mov1-1D" to "Mov5-1D", and the assembling procedure codes "Mov5-1A" to "Mov1-3A" are displayed according to the order of the assembling procedure codes and the assembling procedure codes, respectively. FIG. 24 shows an example of the procedure explanation image for a method of opening a door of an apparatus, which corresponding to the disassembling procedure code "Mov1-1D". This procedure explanation image includes information 2411 to show a direction of opening the door and information 2421 to show a movable angle, and the user carries out the work while referring to this image. The maintenance terminal 3 displays the next procedure explanation image in response to an instruction from the user, for example. Subsequently, the maintenance terminal 3 displays the procedure explanation image according to the order of the disassembling procedure code. FIG. 25 is an example of the procedure explanation image corresponding to the disassembling procedure code "Mov1-3D", and includes information 2511 to show the movable direction of a controller, which is a component to be disassembled.

Figure 26:
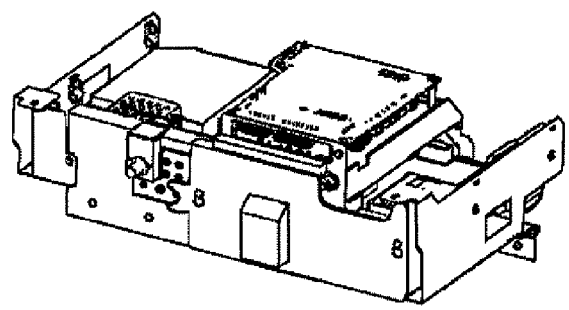
FIG. 26 is a diagram showing an example of the procedure explanation image corresponding to the disassembling procedure code.
Figure 27:
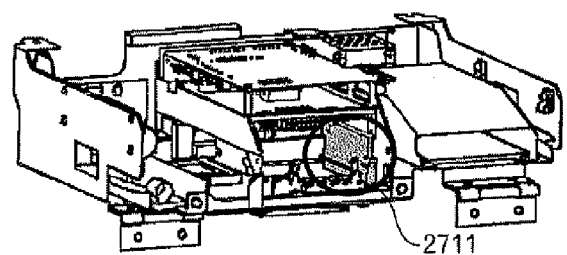
FIG. 27 is a diagram showing an example of the procedure explanation image corresponding to the disassembling procedure code.
Figure 28:
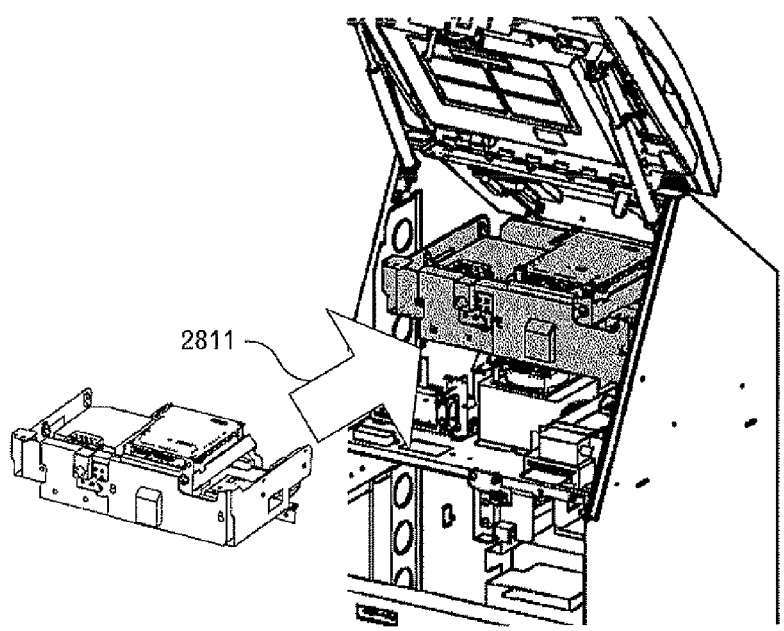
FIG. 28 is a diagram showing an example of the procedure explanation image corresponding to an assembling procedure code.

FIG. 26 shows an example of an image of the controller put out at the disassembling step corresponding to the disassembling procedure code "Mov1-3D". FIG. 27 shows an image viewed from an opposite side of the component, and shows an example of the procedure explanation image corresponding to the disassembling procedure code "Mov5-1D". In the image shown in FIG. 27, the memory module 2711, which is a component to be disassembled, is emphasized. Next, the procedure explanation image for an installation method of the memory module, which corresponding to the assembling procedure code "Mov5-1A" is displayed. Subsequently, the work procedure is displayed according to the order of the assembling procedure codes. FIG. 28 shows an example of the procedure explanation image corresponding to the assembling procedure code "Mov1-3A". The procedure explanation image corresponding to the assembling procedure code is the same as the procedure explanation image corresponding to the disassembling procedure code, basically, for example, but the explanation for the movable part is different from the procedure explanation image corresponding to the disassembling procedure code. For example, the procedure explanation image shown in FIG. 28 is the same as the procedure explanation image shown in FIG. 25 except for the explanation for the movable part 2811. Incidentally, the images shown in FIGS. 25 and 28 may be static images or animation images. The user confirms the operation for the exchanged component at the end of the assembling up to the assembling procedure code "Mov1-3A" corresponding to the diagnostic step.

The maintenance terminal 3 accepts an input of the diagnostic result from the user (step S33). When the recovery is input from the user (step S35: Yes route), the maintenance terminal 3 transmits the recovery notification to the maintenance server 5 (step S37), and displays the procedure explanation image by using the procedure data received from the maintenance server 5 at the step S47. In this embodiment, the procedure explanation image corresponding to the assembling procedure code "Mov1-2A" to "Mov1-1A" is displayed according to the order of the assembling procedure codes. The user refers to the procedure explanation images to complete the exchange work.

When the input of the recovery unfinished state is accepted from the user (step S35: No route), the processing shifts to the other error cause handling processing (step S99). In this embodiment, the disassembling procedure codes "Mov1-3D" to "Mov22-2D" are identified at the step S355, and the assembling procedure codes "Mov22-2A" to "Mov1-3A" are identified at the step S361. The maintenance terminal 3 receives the procedure explanation data corresponding to the disassembling procedure codes and the assembling procedure codes from the maintenance server 5 (step S371). By carrying out the error cause handling processing, it is possible to identify the efficient work procedure, in which the steps to return to a state before the disassembling and to start disassembling again are omitted, and present the work procedure for the user.

Examples of the procedure explanation images that the maintenance terminal 3 displays by using the procedure explanation data and an example of the component exchange work using the procedure explanation image will be explained by using FIGS. 29 to 33. At the time of the step S373, the user advances the work up to a timing when the component corresponding to "Mov1-3A" has been assembled. The maintenance terminal 3 displays the corresponding procedure explanation image.

Figure 29:
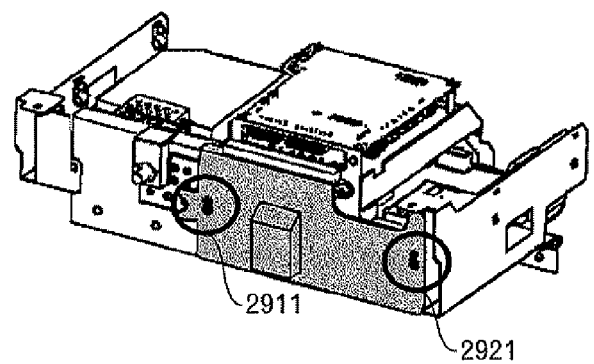
FIG. 29 is a diagram showing an example of the procedure explanation image corresponding to the disassembling procedure code.
Figure 30:
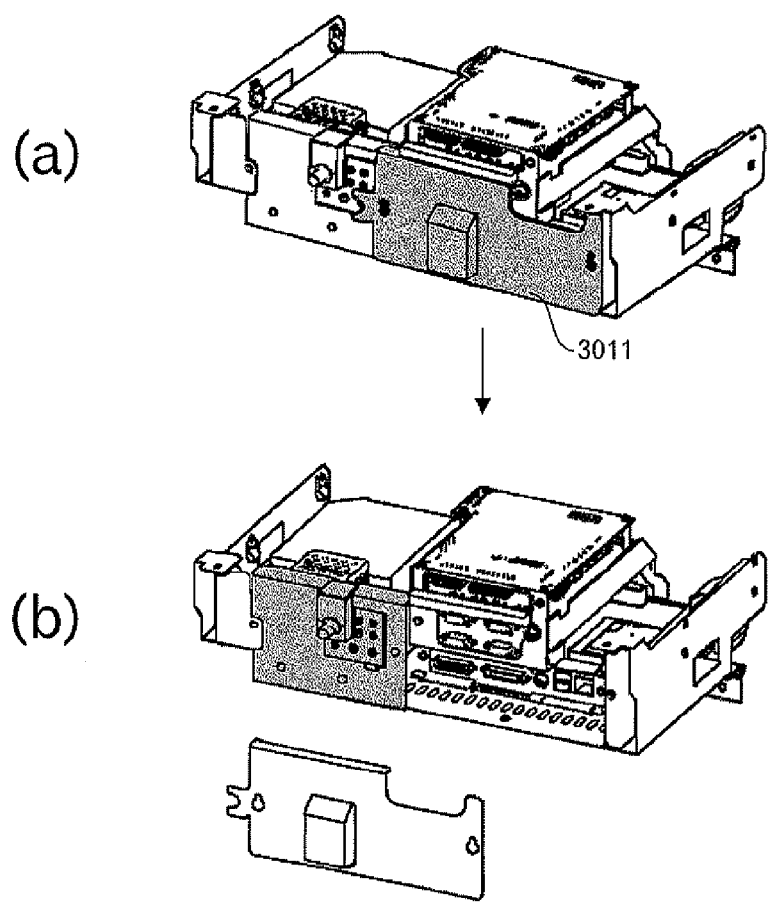
FIG. 30 is a diagram showing an example of the procedure explanation image corresponding to the disassembling procedure code.
Figure 33:
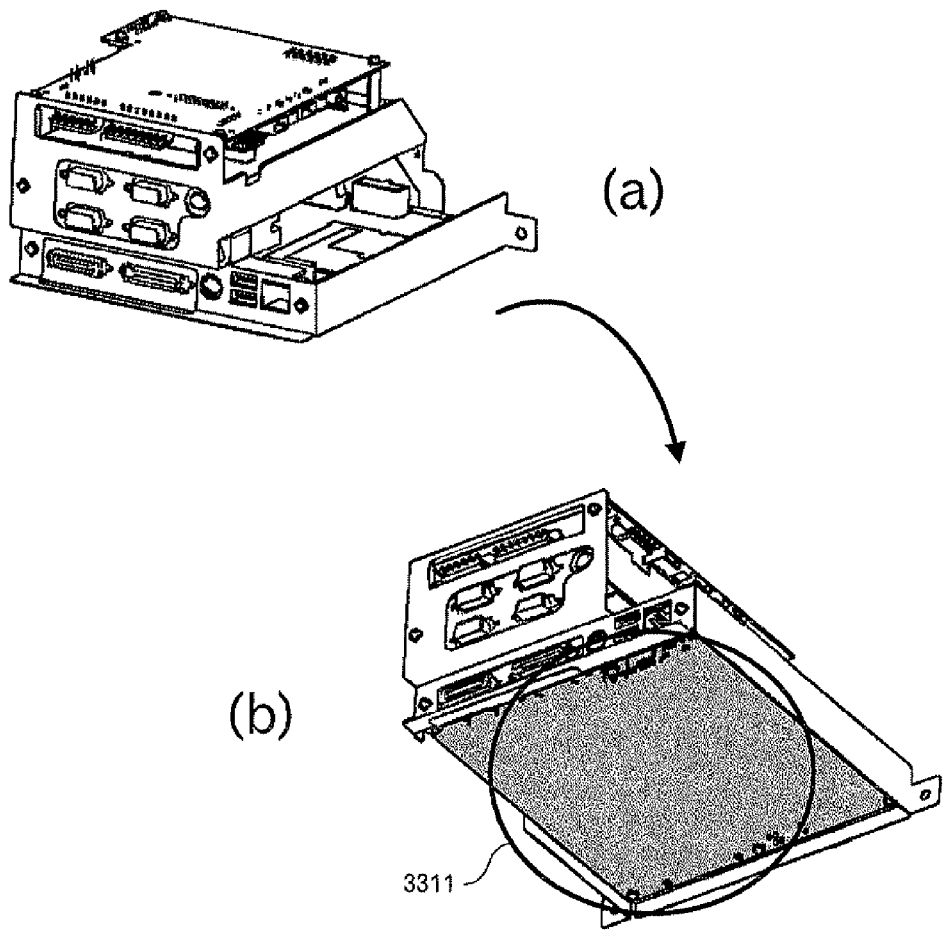
FIG. 33 is a diagram showing an example of the procedure explanation image corresponding to the disassembling procedure code.

Next, the procedure explanation image corresponding to the disassembling procedure code "Mov5-2D" is displayed. An example of the procedure explanation image is shown in FIG. 29. In the image shown in FIG. 29, screws 2911 and 2921, which are to be disassembled, are emphasized. Incidentally, when plural components to be worked exist like this procedure explanation image, the highlight may be attached to the respective components in turn according to the order of the work. Next, the procedure explanation image corresponding to the disassembling procedure code "Mov5-3D" is displayed. An example of the procedure explanation image is shown in FIG. 30. In the image shown in FIG. 30, by displaying, firstly, the image (a) in which the panel A3011, which is a component to be disassembled, is emphasized, is displayed, and displaying, next, the image (b) of the controller after the panel A is put out, the components to be worked and the work method are clearly indicated. Incidentally, the images (a) and (b) may be separate static images, and may correspond to a continuous animation image. Subsequently, the procedure explanation image is displayed according to the order of the disassembling procedure code. In this embodiment, FIG. 31 shows an example of the procedure explanation image corresponding to the disassembling procedure code "Mov5-5D", and FIG. 32 shows an example of the procedure explanation image corresponding to the disassembling procedure code "Mov5-7D". Similarly to FIG. 30, also as for the images shown in FIGS. 31 and 32, by displaying, firstly, an image (a) in which the component to be disassembled is emphasized and displaying, next, an image (b) of the component to be disassembled, the components to be worked and the work procedure are clearly indicated. Next, the procedure explanation image corresponding to the disassembling procedure code "Mov22-2D" is displayed. An example of the procedure explanation image is shown in FIG. 33. The image shown in FIG. 33 includes an image (a) of the PT board module put out at the disassembling step corresponding to the disassembling procedure code "Mov5-7D", for example, an animation to move the PT board module upwardly, downwardly and reversely, and an image (b) that the PT board module is viewed from the bottom. By showing the animation to move the PT board module reversely, and an image emphasizing the CPU board 3311, which is a component to be exchanged, the components to be worked and the work method are clearly indicated for the user.

After displaying all of the procedure explanation images corresponding to the disassembling procedure codes, the procedure explanation images corresponding to the assembling procedure codes are displayed according to the order of the assembling procedure codes. Next, the processing returns to the step S33, and an input from the user is accepted.

As described above, according to this embodiment, by carrying out the work according to the display of the explanation data of the work procedure identified by this system, even the user, who is not any skillful FE, can efficiently carry out the exchange work of the component.

As described above, although the embodiment of this invention has been described, this invention is not limited to this embodiment. For example, although the functional block diagram of the maintenance server 5 is shown, as an example, in FIGS. 1 and 2, this diagram does not always correspond to actual program modules. In addition, the server 5 may be configured by plural computers.

Figure 34:
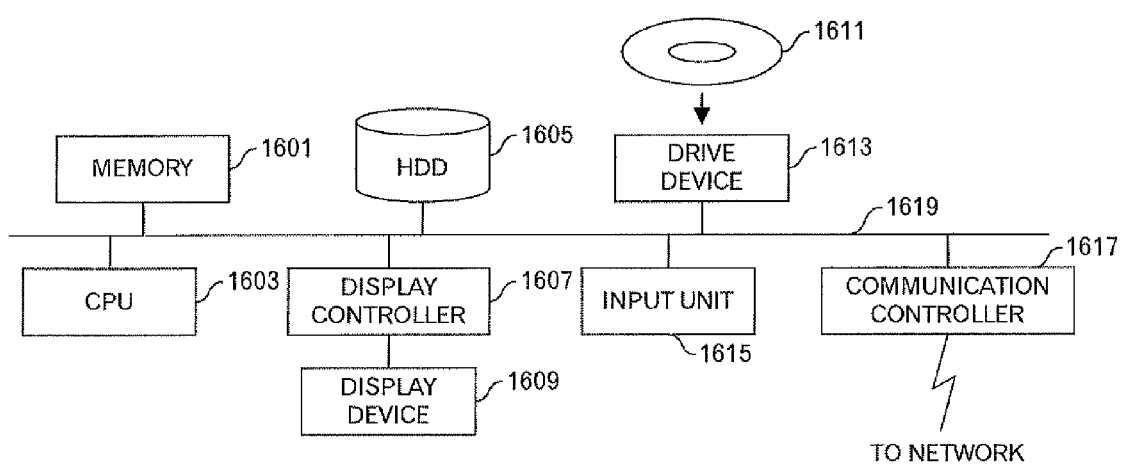
FIG. 34 is a functional block diagram of a computer.

Incidentally, the aforementioned maintenance terminal 3 and the maintenance server 5 are computer devices as shown in FIG. 34. That is, a memory 1601 (storage device), a CPU 1603 (processor), a hard disk drive (HDD) 1605, a display controller 1607 connected to a display device 1609, a drive device 1613 for a removal disk 1611, an input device 1615, and a communication controller 1617 for connection with a network are connected through a bus 1619 as shown in FIG. 34. An operating system (OS) and an application program for carrying out the foregoing processing in the embodiment, are stored in the HDD 1605, and when executed by the CPU 1603, they are read out from the HDD 1605 to the memory 1601. As the need arises, the CPU 1603 controls the display controller 1607, the communication controller 1617, and the drive device 1613, and causes them to perform necessary operations. Besides, intermediate processing data is stored in the memory 1601, and if necessary, it is stored in the HDD 1605. In this embodiment of this invention, the application program to realize the aforementioned functions is stored in the removal disk 1611 and distributed, and then it is installed into the HDD 1605 from the drive device 1613. It may be installed into the HDD 1605 via the network such as the Internet and the communication controller 1617. In the computer as stated above, the hardware such as the CPU 1603 and the memory 1601, the OS and the necessary application program are systematically cooperated with each other, so that various functions as described above in details are realized.

What is claimed is:

1. A method for determining a procedure to exchange a component of an apparatus, said method being executed by a computer comprising a storage unit, a procedure storage, a component data storage, an output data storage and a processor, and said method comprising:

said processor executing operations including:

storing data concerning a first component corresponding to an error code output from said apparatus into said storage unit;

receiving failure data of a first operation verification of said apparatus, wherein said first operation verification was carried out after exchange of said first component and an assembling work of disassembled components;

storing data concerning a second component corresponding to said error code into said storage unit;

retrieving, from said component data storage storing data of components, and disassembling steps of each said component and assembling steps of each said component, a first disassembling procedure of said first component, wherein said first disassembling procedure comprises steps from a disassembling step that is a reverse step of an assembling step carried out immediately before said first operation verification to a disassembling step of said first component;

retrieving from said component data storage, a second disassembling procedure of said second component, wherein said second disassembling procedure comprises steps from a primary disassembling step to be carried out when any component of said apparatus is exchanged to a disassembling step of said second component;

storing said first and second disassembling procedures into said procedure storage;

determining whether or not said first disassembling procedure is included in said second disassembling procedure;

after determining that said first disassembling procedure is included in said second disassembling procedure, extracting, from said procedure storage, said disassembling step that is said reverse step of said assembling step carried out immediately before said first operation verification and subsequent disassembling steps among said second disassembling procedure, and storing the extracted disassembling steps into said output data storage; and outputting procedure explanation data corresponding to the steps stored in said output data storage.

2. The method as set forth in claim 1, wherein said operations further include:

extracting from said component data storage, as an assembling procedure of said second component, an assembling procedure from an assembling step of said second component to an assembling step carried out immediately before a second operation verification, which is carried out after exchange of said second component and an assembling work of disassembled components, and storing the extracted assembling procedure of said second component into said procedure storage;

after determining that said first disassembling procedure is included in said second disassembling procedure, further determining whether or not an assembling step of said first component, which is extracted from said component data storage, is included in said assembling procedure of said second component; and after further determining that said assembling step of said first component is included in said assembling procedure of said second component, extract extracting said disassembling step that is said reverse step of said assembling step carried out immediately before said first operation verification and subsequent steps among said second disassembling procedure of said second component, and storing the extracted steps and said assembling procedure of said second component into said output data storage.

3. The method as set forth in claim 1, wherein said operations further include:

after determining that said first disassembling procedure is not included in said second disassembling procedure, storing said first disassembling procedure of said first component and an assembling step of said first component into said output data storage;

extracting from said component data storage, as an assembling procedure of said first component, an assembling procedure from a next step of said assembling step of said first component to an assembling step that is a reverse step of said primary disassembling step, and storing the extracted assembling procedure of said first component into said procedure storage;

extracting disassembling steps corresponding to assembling steps included in said assembling procedure of said first component among said disassembling steps included in said second disassembling procedure of said second component;

determining a final disassembling step among the extracted disassembling steps, and storing the determined final disassembling step into said storage unit; and storing an assembling procedure from a next assembling step of said assembling step of said first component to an assembling step that is a reverse step of said determined final disassembling step, among said assembling procedure of said first component, and a disassembling procedure from said determined final disassembling step to said disassembling step of said second component, among said second disassembling procedure of said second component into said output data storage.

4. The method as set forth in claim 1, wherein said component data storage further stores data concerning a component to be assembled immediately before said operation verification.

5. The method as set forth in claim 1, wherein said component data storage further stores data managing orders of disassembling steps and assembling steps of each said component.

6. The method as set forth in claim 1, wherein said component data storage further stores data representing parent-child and brother relations of said components of said apparatus.

7. The method as set forth in claim 1, wherein said computer further comprises an error data storage storing, for each said error code, data concerning said components, and said operations further includes extracting from said error data storage, data concerning said components, corresponding to said error code output from said apparatus.

8. A computer-readable storage medium storing a program for causing a computer to execute a process for determining a procedure to exchange a component of an apparatus, said process comprising:

storing data concerning a first component corresponding to an error code output from said apparatus into a storage unit;

receiving failure data of a first operation verification of said apparatus, wherein said first operation verification was carried out after exchange of said first component and an assembling work of disassembled components;

storing data concerning a second component corresponding to said error code into said storage unit;

retrieving, from a component data storage storing data of components, and disassembling steps of each said component and assembling steps of each said component, a first disassembling procedure of said first component, wherein said first disassembling procedure comprises steps from a disassembling step that is a reverse step of an assembling step carried out immediately before said first operation verification to a disassembling step of said first component;

retrieving from said component data storage, a second disassembling procedure of said second component, wherein said second disassembling procedure comprises steps from a primary disassembling step to be carried out when any component of said apparatus is exchanged to a disassembling step of said second component;

storing said first and second disassembling procedures into a procedure storage;

determining whether or not said first disassembling procedure is included in said second disassembling procedure;

after determining that said first disassembling procedure is included in said second disassembling procedure, extracting, from said procedure storage, said disassembling step that is said reverse step of said assembling step carried out immediately before said first operation verification and subsequent disassembling steps among said second disassembling procedure, and storing the extracted disassembling steps into an output data storage; and outputting procedure explanation data corresponding to the steps stored in said output data storage.

9. The computer-readable storage medium as set forth in claim 8, wherein said process further comprises:

extracting from said component data storage, as an assembling procedure of said second component, an assembling procedure from an assembling step of said second component to an assembling step carried out immediately before a second operation verification, which is carried out after exchange of said second component and an assembling work of disassembled components, and storing the extracted assembling procedure of said second component into said procedure storage;

after determining that said first disassembling procedure is included in said second disassembling procedure, further determining whether or not an assembling step of said first component, which is extracted from said component data storage, is included in said assembling procedure of said second component; and after further determining that said assembling step of said first component is included in said assembling procedure of said second component, extracting said disassembling step that is said reverse step of said assembling step carried out immediately before said first operation verification and subsequent steps among said second disassembling procedure of said second component, and storing the extracted steps and said assembling procedure of said second component into said output data storage.

10. The computer-readable storage medium as set forth in claim 8, wherein said process further comprises:

after determining that said first disassembling procedure is not included in said second disassembling procedure, storing said first disassembling procedure of said first component and an assembling step of said first component into said output data storage;

extracting from said component data storage, as an assembling procedure of said first component, an assembling procedure from a next step of said assembling step of said first component to an assembling step that is a reverse step of said primary disassembling step, and storing the extracted assembling procedure of said first component into said procedure storage;

extracting disassembling steps corresponding to assembling steps included in said assembling procedure of said first component among said disassembling steps included in said second disassembling procedure of said second component;

determining a final disassembling step among the extracted disassembling steps, and storing the determined final disassembling step into said storage unit; and storing an assembling procedure from a next assembling step of said assembling step of said first component to an assembling step that is a reverse step of said determined final disassembling step, among said assembling procedure of said first component, and a disassembling procedure from said determined final disassembling step to said disassembling step of said second component, among said second disassembling procedure of said second component into said output data storage.

11. A maintenance apparatus for determining a procedure to exchange a component of an apparatus, comprising:
- a storage unit;
- a procedure storage;
- a component data storage;
- an output data storage;
- a first unit that stores data concerning a first component corresponding to an error code output from said apparatus into said storage unit;
- a second unit that receives failure data of a first operation verification of said apparatus, wherein said first operation verification was carried out after exchange of said first component and an assembling work of disassembled components;
- a third unit that stores data concerning a second component corresponding to said error code into said storage unit;
- a fourth unit that retrieves, from said component data storage storing data of components, and disassembling steps of each said component and assembling steps of each said component, a first disassembling procedure of said first component, wherein said first disassembling procedure comprises steps from a disassembling step that is a reverse step of an assembling step carried out immediately before said first operation verification to a disassembling step of said first component;
- a fifth unit that retrieves from said component data storage, a second disassembling procedure of said second component, wherein said second disassembling procedure comprises steps from a primary disassembling step to be carried out when any component of said apparatus is exchanged to a disassembling step of said second component;
- a sixth unit that stores said first and second procedures into said procedure storage;
- a seventh unit that determines whether or not said first disassembling procedure is included in said second disassembling procedure;
- an eighth unit that extracts from said procedure storage, said disassembling step that is said reverse step of said assembling step carried out immediately before said first operation verification and subsequent disassembling steps among said second disassembling procedure after determining that said first disassembling procedure is included in said second disassembling procedure, and stores the extracted disassembling steps into said output data; and
- a ninth unit that outputs procedure explanation data corresponding to the steps stored in said output data storage.

12. The maintenance apparatus as set forth in claim 11, further comprising:
- a tenth unit that extracts from said component data storage, as an assembling procedure of said second component, an assembling procedure from an assembling step of said second component to an assembling step carried out immediately before a second operation verification, which is carried out after exchange of said second component and an assembling work of disassembled components, and stores the extracted assembling procedure of said second component into said procedure storage;
- an eleventh unit that further determines, after determining that said first disassembling procedure is included in said second disassembling procedure, whether or not an assembling step of said first component, which is extracted from said component data storage, is included in said assembling procedure of said second component;
- a twelfth unit that extracts, after further determining that said assembling step of said first component is included in said assembling procedure of said second component, said disassembling step that is said reverse step of said assembling step carried out immediately before said first operation verification and subsequent steps among said second disassembling procedure of said second component, and stores the extracted steps and said assembling procedure of said second component into said output data storage.

13. The maintenance apparatus as set forth in claim 11, further comprising:
- a thirteenth unit that stores, after determining that said first disassembling procedure is not included in said second disassembling procedure, said first disassembling procedure of said first component and an assembling step of said first component into said output data storage;
- a fourteenth unit that extracts from said component data storage, as an assembling procedure of said first component, an assembling procedure from a next step of said assembling step of said first component to an assembling step that is a reverse step of said first disassembling step, and stores the extracted assembling procedure of said first component into said procedure storage;
- a fifteenth unit that extracts disassembling steps corresponding to assembling steps included in said assembling procedure of said first component among said disassembling steps included in said second disassembling procedure of said second component;
- a sixteenth unit that determines a final disassembling step among the extracted disassembling steps, and stores the determined final disassembling step into said storage unit; and
- a seventeenth unit that stores an assembling procedure from a next assembling step of said assembling step of said first component to an assembling step that is a reverse step of said determined final disassembling step, among said assembling procedure of said first component, and a disassembling procedure from said determined final disassembling step to said second disassembling step of said second component, among said disassembling procedure of said second component into said output data storage.

14. A computer implemented method, comprising:
the computer executing operations including:
- receiving an error code indicating a failure of assembly of components as a result of verification;
- determining whether a reassembly procedure of a first of the components includes a procedure of a second of the components based on whether the procedure of the second of the components includes a primary procedure necessary when any of the components is disassembled;
- extracting information defining procedures for assembling the first and second components by identifying each operation need for the reassembly; and
- displaying the extracted information, where the reassembly procedure of the first of the components includes a disassembling operation that is a reverse of an assembling operation carried out immediately before the verification.

* * * * *

UNITED STATES PATENT AND TRADEMARK OFFICE
CERTIFICATE OF CORRECTION

| | | |
|---|---|---|
| PATENT NO. | : 7,610,171 B2 | Page 1 of 1 |
| APPLICATION NO. | : 11/780665 | |
| DATED | : October 27, 2009 | |
| INVENTOR(S) | : Sachio Onoshita et al. | |

It is certified that error appears in the above-identified patent and that said Letters Patent is hereby corrected as shown below:

Column 24, Line 45, before "extracting" delete "extract".

Column 27, Line 38, after "second" insert --disassembling--.

Column 27, Line 51, change "data;" to --data storage;--.

Signed and Sealed this

Nineteenth Day of January, 2010

David J. Kappos
*Director of the United States Patent and Trademark Office*